(12) United States Patent
Yamamoto et al.

(10) Patent No.: US 11,297,208 B2
(45) Date of Patent: Apr. 5, 2022

(54) METHOD OF CREATING TEACHER DATA, COLOR PREDICTION MODEL CREATION APPARATUS, AND METHOD OF CREATING COLOR PREDICTION MODEL

(71) Applicant: SEIKO EPSON CORPORATION, Tokyo (JP)

(72) Inventors: Yuko Yamamoto, Nagano (JP); Mitsuhiro Yamashita, Nagano (JP); Masayuki Seko, Nagano (JP); Takumi Shimomukai, Nagano (JP); Katsuyuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/209,392

(22) Filed: Mar. 23, 2021

(65) Prior Publication Data
US 2021/0306525 A1    Sep. 30, 2021

(30) Foreign Application Priority Data
Mar. 25, 2020    (JP) .............................. JP2020-053714

(51) Int. Cl.
*H04N 1/60* (2006.01)
*G06N 20/00* (2019.01)
*G06F 3/12* (2006.01)

(52) U.S. Cl.
CPC ........... *H04N 1/603* (2013.01); *G06F 3/1208* (2013.01); *G06N 20/00* (2019.01); *H04N 1/6058* (2013.01)

(58) Field of Classification Search
CPC ...... H04N 1/603; H04N 1/0658; H04N 1/605; G06F 3/1208; G06N 20/00
See application file for complete search history.

(56) References Cited

U.S. PATENT DOCUMENTS

| 5,563,724 | A  | * | 10/1996 | Boll  | .......................... | H04N 1/54 |
| | | | | | | 347/43 |
| 7,450,267 | B2 | * | 11/2008 | Ito  | ......................... | H04N 1/6058 |
| | | | | | | 345/600 |
| 7,602,525 | B2 | * | 10/2009 | Arai  | ...................... | H04N 1/6058 |
| | | | | | | 358/1.9 |
| 8,199,367 | B2 | * | 6/2012 | Hoshii  | ..................... | H04N 1/40 |
| | | | | | | 358/3.24 |

(Continued)

FOREIGN PATENT DOCUMENTS

| JP | 4323890 B2 | * | 9/2009 | ............... H04N 1/54 |
| JP | 2012-249182 A | | 12/2012 | |

(Continued)

*Primary Examiner* — Ted W Barnes
(74) *Attorney, Agent, or Firm* — Global IP Counselors, LLP

(57) ABSTRACT

A method of creating teacher data used for creating a color prediction model that predicts a spectral reflectance of a printed matter printed using an ink amount set from the ink amount set that is a combination of ink amounts of inks used for printing, includes, in an ink amount space in which a plurality of lattice points are disposed, selecting an ink amount set from an ink amount set associated with each lattice point, according to a predetermined selection rule, acquiring a spectral reflectance of a color chart printed on a printing medium using the selected ink amount set, and setting the teacher data using the selected ink amount set as an input value and the acquired spectral reflectance as an output value.

17 Claims, 19 Drawing Sheets

| Ls | C | M | Y | K | Or |
|---|---|---|---|---|---|
| BASE LUT INK AMOUNT SET | 0 | 9 | 68 | 2 | 1 |

Cm1

| No | C | M | Y | K | Or |
|---|---|---|---|---|---|
| 1 | 0 | 0 | 0 | 0 | 0 |
| 2 | 5 | 7 | 8 | 6 | 3 |
| 3 | 15 | 20 | 30 | 18 | 10 |
| 4 | 45 | 65 | 70 | 50 | 40 |
| 5 | 100 | 100 | 100 | 100 | 100 |

| | C | M | Y | K | Or |
|---|---|---|---|---|---|
| CLOSEST VALUE TO INK AMOUNT IN INK AMOUNT SPACE | 0 | 7 | 70 | 0 | 0 |

(56) References Cited

U.S. PATENT DOCUMENTS

| | | | |
|---|---|---|---|
| 2003/0076516 A1* | 4/2003 | Saito | H04N 1/6025 358/1.9 |
| 2003/0081831 A1* | 5/2003 | Fukao | H04N 1/6025 382/167 |
| 2005/0083346 A1* | 4/2005 | Takahashi | H04N 1/6033 345/600 |
| 2005/0083540 A1* | 4/2005 | Hersch | H04N 1/603 358/1.9 |
| 2005/0270600 A1* | 12/2005 | Ito | H04N 1/603 358/518 |
| 2007/0030505 A1* | 2/2007 | Ito | H04N 1/6033 358/1.9 |
| 2007/0195342 A1* | 8/2007 | Sugiura | H04N 1/64 358/1.9 |
| 2007/0273738 A1* | 11/2007 | Tsuchiya | H04N 1/6075 347/100 |
| 2007/0273906 A1* | 11/2007 | Tsuchiya | H04N 1/54 358/1.9 |
| 2008/0018962 A1* | 1/2008 | Kawai | H04N 1/6019 358/522 |
| 2009/0086225 A1* | 4/2009 | Fan | H04N 1/6019 358/1.9 |
| 2011/0069334 A1* | 3/2011 | Hoshii | H04N 1/6033 358/1.9 |
| 2011/0299101 A1* | 12/2011 | Namikata | H04N 1/6019 358/1.9 |
| 2012/0043751 A1* | 2/2012 | Hersch | G07D 7/1205 283/92 |
| 2012/0050767 A1* | 3/2012 | Tanaka | H04N 1/6058 358/1.9 |
| 2012/0224199 A1* | 9/2012 | Fukuda | H04N 1/6097 358/1.9 |
| 2012/0243011 A1* | 9/2012 | Fukuda | G06F 15/00 358/1.9 |
| 2013/0155468 A1* | 6/2013 | Ukishima | H04N 1/52 358/3.23 |
| 2014/0267459 A1* | 9/2014 | Kanai | B41J 11/009 345/690 |
| 2017/0280023 A1* | 9/2017 | Kobayashi | G06K 15/02 |
| 2018/0152603 A1* | 5/2018 | Seko | H04N 1/6008 |
| 2018/0295258 A1* | 10/2018 | Ochiai | H04N 1/6008 |
| 2018/0352117 A1* | 12/2018 | Fukasawa | H04N 1/6052 |
| 2020/0244839 A1* | 7/2020 | Hiramoto | H04N 1/6058 |
| 2020/0412912 A1* | 12/2020 | Maeda | H04N 1/6002 |
| 2021/0248434 A1* | 8/2021 | Ueda | H04N 1/60 |

FOREIGN PATENT DOCUMENTS

| | | | | |
|---|---|---|---|---|
| JP | 2012249182 A | * | 12/2012 | |
| WO | WO-2005043889 A1 | * | 5/2005 | H04N 1/6033 |
| WO | WO-2017104449 A1 | * | 6/2017 | H04N 1/6016 |

* cited by examiner

FIG. 3

ACm

| LATTICE POSITION | CYAN | MAGENTA | YELLOW | BLACK | ORANGE |
|---|---|---|---|---|---|
| 1 | 0 | 0 | 0 | 0 | 0 |
| 2 | 0 | 0 | 0 | 0 | 3 |
| 3 | 0 | 0 | 0 | 0 | 10 |
| 4 | 0 | 0 | 0 | 0 | 40 |
| 5 | 0 | 0 | 0 | 0 | 100 |
| 6 | 0 | 0 | 0 | 6 | 0 |
| 7 | 0 | 0 | 0 | 6 | 3 |
| 8 | 0 | 0 | 0 | 6 | 10 |
| ... | | | | | |
| | 0 | 0 | 8 | 0 | 0 |
| | 0 | 0 | 8 | 0 | 3 |
| | 0 | 0 | 8 | 0 | 10 |
| | 0 | 0 | 8 | 0 | 40 |
| | 0 | 0 | 8 | 0 | 100 |
| | 0 | 0 | 8 | 6 | 10 |
| ... | | | | | |
| | 100 | 100 | 100 | 100 | 0 |
| | 100 | 100 | 100 | 100 | 3 |
| | 100 | 100 | 100 | 100 | 10 |
| | 100 | 100 | 100 | 100 | 40 |
| M | 100 | 100 | 100 | 100 | 100 |

FIG. 6

| Ls | C | M | Y | K | Or |
|---|---|---|---|---|---|
| BASE LUT INK AMOUNT SET | 0 | 9 | 68 | 2 | 1 |

⇩

Cm1

| No | C | M | Y | K | Or |
|---|---|---|---|---|---|
| 1 | 0 | 0 | 0 | 0 | 0 |
| 2 | 5 | 7 | 8 | 6 | 3 |
| 3 | 15 | 20 | 30 | 18 | 10 |
| 4 | 45 | 65 | 70 | 50 | 40 |
| 5 | 100 | 100 | 100 | 100 | 100 |

⇩

| | C | M | Y | K | Or |
|---|---|---|---|---|---|
| CLOSEST VALUE TO INK AMOUNT IN INK AMOUNT SPACE | 0 | 7 | 70 | 0 | 0 |

FIG. 8

| Ls | C | M | Y | K | Or |
|---|---|---|---|---|---|
| BASE LUT INK AMOUNT SET | 0 | 9 | 68 | 2 | 1 |

⇩

Cm1

| No | C | M | Y | K | Or |
|---|---|---|---|---|---|
| 1 | 0 | 0 | 0 | 0 | 0 |
| 2 | 5 | 7 | 8 | 6 | 3 |
| 3 | 15 | 20 | 30 | 18 | 10 |
| 4 | 45 | 65 | 70 | 50 | 40 |
| 5 | 100 | 100 | 100 | 100 | 100 |

⇩

| | C | M | Y | K | Or |
|---|---|---|---|---|---|
| CLOSEST VALUE TO INK AMOUNT IN INK AMOUNT SPACE | 0 | 7 | 70 | 0 | 3 |

FIG. 10

| No | CLOSEST VALUE TO INK AMOUNT IN INK AMOUNT SPACE | | | | | INK ORDER | DUTY LIMIT VALUE |
|---|---|---|---|---|---|---|---|
| | C | M | Y | K | Or | | |
| 1 | 0 | 0 | 0 | 0 | 40 | 1 | 40 |
| 2 | 0 | 0 | 0 | 0 | 100 | 1 | 100 |
| 3 | 0 | 100 | 70 | 0 | 0 | 2 | 170 |
| 4 | 0 | 100 | 100 | 0 | 0 | 2 | 200 |
| 5 | 45 | 65 | 70 | 50 | 0 | 4 | 230 |

⇧

| PREDETERMINED VALUE 1 | PREDETERMINED VALUE 2 |
|---|---|
| 0.4 | 0 |
| 1 | 0.5 |
| 0.85 | 0 |
| 1 | 0.5 |
| 1 | 0.5 |

| INK ORDER | PARAMETER | SELECTION NUMBER | SELECTION RATE | |
|---|---|---|---|---|
| 1 | 25 | 25 | 100 | HIGH |
| 2 | 250 | 128 | 51.2 | |
| 3 | 1250 | 100 | 8 | |
| 4 | 3125 | 100 | 3.2 | |
| 5 | 3125 | 50 | 1.6 | LOW |

| LATTICE POINT POSITION | CUMULATIVE COLOR VALUE DIFFERENCE | INK AMOUNT |
|---|---|---|
| 1 | 0 | 0 |
| 2 | 18.5 | 5 |
| 3 | 37 | 15 |
| 4 | 55.5 | 45 |
| 5 | 74 | 100 |

FIG. 19

| LATTICE POINT POSITION | CUMULATIVE COLOR VALUE DIFFERENCE | INK AMOUNT |
|---|---|---|
| 1 | 0 | 0 |
| 2 | 9 | 3 |
| 3 | 18.5 | 5 |
| 4 | 37 | 15 |
| 5 | 55.5 | 45 |
| 6 | 74 | 100 |

FIG. 21

| LATTICE POINT POSITION | CUMULATIVE COLOR VALUE DIFFERENCE | INK AMOUNT |
|---|---|---|
| 1 | 0 | 0 |
| 2 | 4 | 2 |
| 3 | 8 | 3 |
| 4 | 18.5 | 5 |
| 5 | 37 | 15 |
| 6 | 55.5 | 45 |
| 7 | 74 | 100 |

METHOD OF CREATING TEACHER DATA, COLOR PREDICTION MODEL CREATION APPARATUS, AND METHOD OF CREATING COLOR PREDICTION MODEL

The present application is based on, and claims priority from JP Application Serial Number 2020-053714, filed Mar. 25, 2020, the disclosure of which is hereby incorporated by reference herein in its entirety.

BACKGROUND

1. Technical Field

The present disclosure relates to a technology for creating a color prediction model.

2. Related Art

In the printer, color conversion processing is performed in which the color value of the input image data represented by the first color system is converted into the color value of the second color system corresponding to the type of ink. In the color conversion processing, a plurality of color conversion tables for associating the color values of the first color system and the color values of the second color system are referred to. Such a color conversion table may be created using a color prediction model in which the printer predicts a color value in an optional ink amount set based on a color measurement value of a color patch printed in a representative ink amount set in all the printable colors. For example, JP-A-2012-249182 discloses a technology for creating a color prediction model by learning the relationship between an ink amount set and a color measurement value of a color patch printed with such an ink amount set using a neural network. In JP-A-2012-249182, the number of sampling of the low-lightness color gamut is increased in order to improve the color prediction accuracy of the low-lightness color gamut.

However, as the number of ink colors used in the printer increases, the number of combinations of ink amount sets becomes enormous, and it is not realistic to improve the color prediction accuracy by increasing the number of sampling. Therefore, a technology capable of improving the color prediction accuracy while suppressing an increase in the number of samplings is desired.

SUMMARY

According to a first aspect of the present disclosure, there is provided a method of creating teacher data used for creating a color prediction model that predicts a spectral reflectance of a printed matter printed using an ink amount set from the ink amount set that is a combination of ink amounts of inks used for printing. The method of creating teacher data includes, in an ink amount space in which a plurality of lattice points are disposed, selecting an ink amount set from an ink amount set associated with each lattice point, according to a predetermined selection rule, acquiring a spectral reflectance of a color chart printed on a printing medium using the selected ink amount set, and setting the teacher data using the selected ink amount set as an input value and the acquired spectral reflectance as an output value.

According to a second aspect of the present disclosure, a color prediction model creation apparatus is provided. The color prediction model creation apparatus includes a color prediction model creation portion that creates a color prediction model by performing machine learning using teacher data created by the method of creating teacher data according to the first aspect.

According to a third aspect of the present disclosure, a method of creating a color prediction model is provided. The method of creating a color prediction model includes creating a color prediction model by performing machine learning using teacher data created by the method of creating teacher data according to the first aspect.

BRIEF DESCRIPTION OF THE DRAWINGS

FIG. 3 is an explanatory diagram illustrating an example of a total combination of ink amount sets.

FIG. 6 is an explanatory diagram schematically illustrating how step S115 is executed.

FIG. 8 is an explanatory diagram schematically illustrating how a step S115a is executed.

FIG. 10 is an explanatory diagram illustrating an example of an ink amount set and an ink order.

FIG. 19 is an explanatory diagram illustrating an example of a cumulative color value difference after a lattice point is added to a low duty portion.

FIG. 21 is an explanatory diagram illustrating an example of a cumulative color value difference after a lattice point is added to a low duty portion.

DESCRIPTION OF EXEMPLARY EMBODIMENTS

A. First Embodiment

Figure 1:
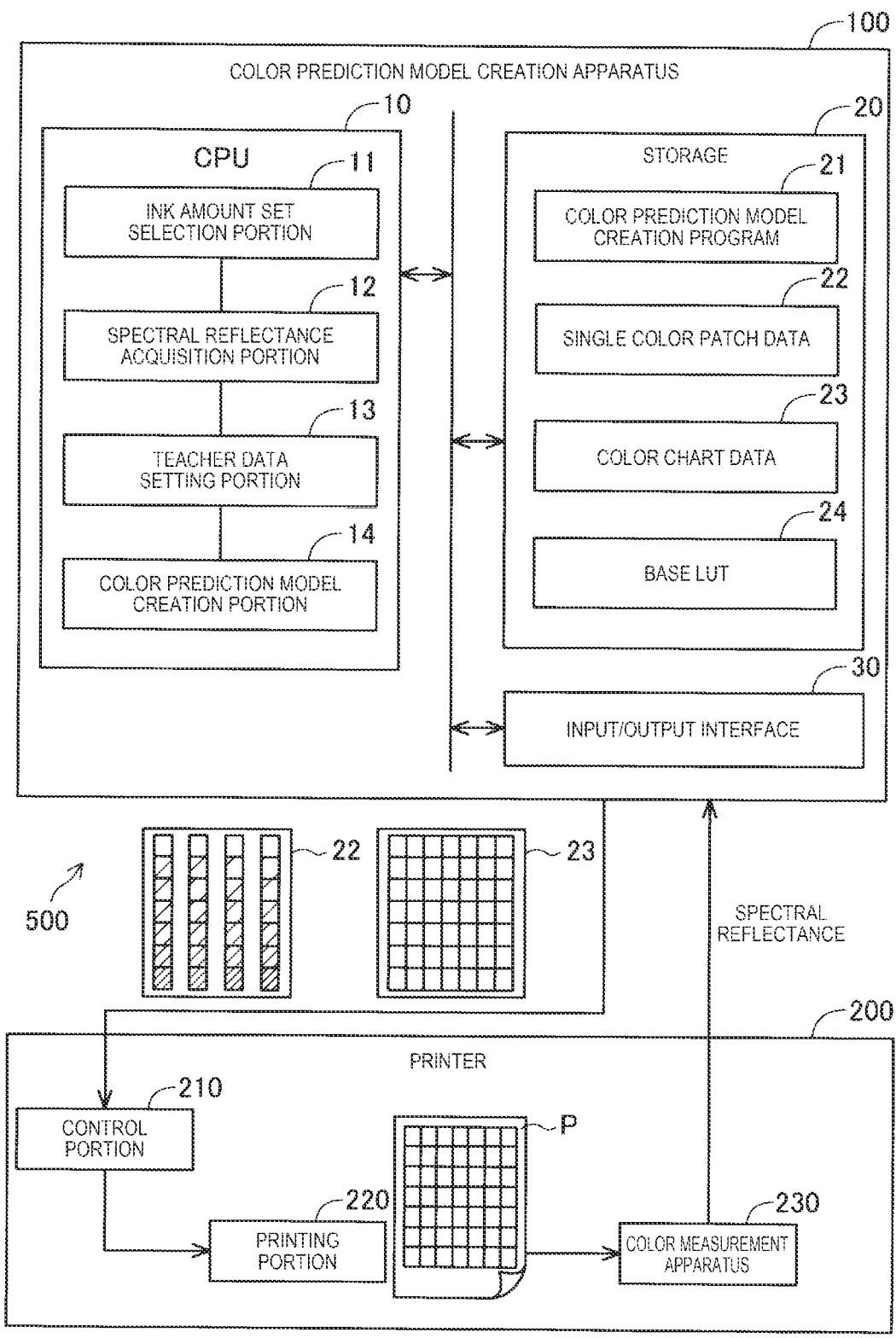
FIG. 1 is a block diagram illustrating a schematic configuration of a color prediction model creation system as an embodiment of the present disclosure.

FIG. 1 is a block diagram illustrating a schematic configuration of a color prediction model creation system 500 as an embodiment of the present disclosure. The color prediction model creation system 500 includes a color prediction model creation apparatus 100 as an embodiment of the present disclosure, and a printer 200 that actually prints an image under the control of the color prediction model creation apparatus 100.

The color prediction model creation apparatus 100 creates a color prediction model that predicts the spectral reflectance of a printed matter when printing is performed with the ink amount set based on the ink amount set which is a combination of the ink amounts of the inks used in the printer 200. The color prediction model creation apparatus 100 actually prints a color chart for a plurality of representative points in the ink amount space represented by the color system of the ink color, acquires the spectral reflectance thereof, and creates a color prediction model by performing learning by a neural network using the correspondence between the ink amount set and the spectral reflectance as learning data.

The color prediction model creation apparatus 100 is a computer including a CPU 10, a storage 20, and an input/output interface 30. The CPU 10, the storage 20, and the input/output interface 30 are communicably bidirectionally coupled via an internal bus. The CPU 10 functions as an ink amount set selection portion 11, a spectral reflectance acquisition portion 12, a teacher data setting portion 13, and a color prediction model creation portion 14 by executing a control program stored in the storage 20 in advance.

The ink amount set selection portion 11 creates all combinations of ink amount sets for a plurality of ink colors that can be used in the printer 200, and selects the ink amount set from the total combination according to a predetermined selection rule.

The spectral reflectance acquisition portion 12 acquires the spectral reflectance of the printing image formed on a printing medium P from a color measurement apparatus 230 described later included in the printer 200.

The teacher data setting portion 13 uses the ink amount set selected by the ink amount set selection portion as an input value, uses the spectral reflectance corresponding to the ink amount set as an output value, and sets the teacher data to be used in the creation of a color prediction model.

The color prediction model creation portion 14 creates a color prediction model by performing machine learning using the teacher data.

The storage 20 includes a ROM, a RAM, and an EEPROM. In addition to the control program that realizes the function of each of the functional portions mentioned above, the storage 20 stores in advance a color prediction model creation program 21, single color patch data 22, color chart data 23, and a base LUT 24.

The color prediction model creation program 21 is a computer program that performs the creation of a color prediction model. The color prediction model creation program 21 is executed, so that the color prediction model creation processing described later is executed.

The single color patch data 22 is image data of a color chart represented by an ink amount set of a single color of each ink color. The single color patch data 22 represents a plurality of patterns formed so that the ink amount is changed in several stages from a state in which the ink amount is small to a state in which the ink amount is thick. The ink amount of a single color (0% to 100%) is associated with each pattern, respectively and used as a color sample of a single color.

The color chart data 23 is image data of a color chart represented by the ink amount. The color chart includes a plurality of color patches. Each of ink amount sets is associated with each color patch and is used as a color sample of a mixed color. In the present embodiment, the ink amount set associated with the color patch is the ink amount set selected by the ink amount set selection portion 11.

The base LUT 24 is a color conversion table in which the CMYK value of the printer is associated with the ink amount set as an apparatus-dependent color system. In addition to the common ink colors (cyan, magenta, yellow and black) used in the printer, the base LUT 24 also defines the ink amount of a spot color ink for example, such as orange, red, green, blue, and purple. An ink amount list which is a list of ink amounts with respect to the ink color defined in the base LUT 24 is stored in the base LUT 24. When the color prediction model is created, and more specifically, when the ink amount set is selected (extracted) by the ink amount set selection portion 11, the ink amount list is referred to. The base LUT 24 is generated using the created color prediction model after the color prediction model is created. In the present specification, it is referred to as the base LUT, but the base LUT 24 means a tentative LUT having the same or similar configuration as the base LUT to be created.

The input/output interface 30 transmits image data to be printed, for example, the single color patch data 22 and the color chart data 23, to the printer 200, and receives the color measurement result of the printing image printed on the printing medium P from the printer 200.

The printer 200 is an ink jet printer that discharges ink of five colors, that is, ink of cyan C, magenta M, yellow Y, black K, and orange Or. The printer 200 forms dots on the printing medium P by discharging ink onto the printing medium P, and prints an image. The printer 200 includes a control portion 210, a printing portion 220, and a color measurement apparatus 230.

The control portion 210 is constituted with a microcomputer including a CPU and a storage, and performs the entire control of the printer 200. When the control portion 210 receives the image data to be printed from the color prediction model creation apparatus 100, the control portion 210 controls the formation of the printing image on the printing medium P by the printing portion 220. When the control portion 210 receives an instruction to execute color measurement of the printing image from the color prediction model creation apparatus 100, the control portion 210 controls the color measurement of the printing medium P by the color measurement apparatus 230.

The printing portion 220 includes a printing head, and discharges ink droplets to the printing medium P in response to a control signal from the control portion 210 to print an image.

The color measurement apparatus 230 measures the color of the printed matter created by the printing portion 220 and the printed matter created by another printer. In the present embodiment, the color measurement apparatus 230 measures a spectral reflectance $R(\lambda)$ of the dot group formed on the printing medium P. The color measurement apparatus 230 may not be provided in the printer 200. In this case, the color prediction model creation apparatus 100 may acquire the spectral reflectance by controlling another reading apparatus such as a spectrocolorimeter or a scanner.

Prior to the detailed explanation of the color prediction model creation processing, the color space and the lattice points will be described.

Figure 2:
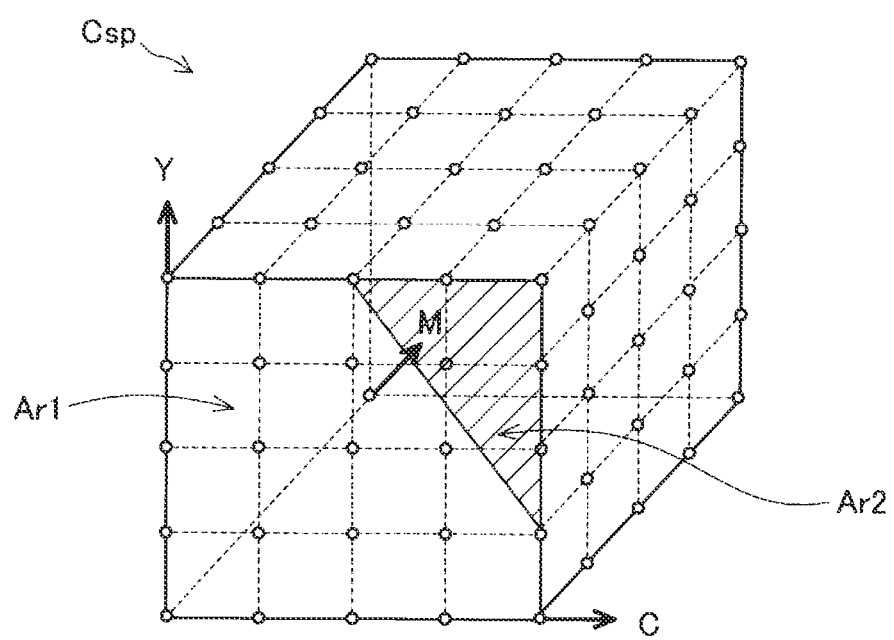
FIG. 2 is an explanatory diagram schematically illustrating an ink amount space.

FIG. 2 is an explanatory diagram schematically illustrating an ink amount space Csp. The ink amount space Csp is a space in which each ink amount set of ink colors C, M, Y, K, and Or is a vector. In FIG. 2, for the sake of convenience of understanding, the color space of the ink amount when K=0 and Or=0 is illustrated, but it is actually a five-dimensional color space. As illustrated in FIG. 2, when the ink amount space Csp is represented as a cube, a plurality of lattice points are disposed in the ink amount space Csp. The lattice points are virtual points in the ink amount space Csp, and one set of CMYK values are set. In the present embodiment, a predetermined value is set as each of the CMYK values at the lattice points. FIG. 2 illustrates a case where 0% to 100% of each color of the ink amount space Csp is divided into four equal portions and the number of grids is 5, and in order to clearly illustrate the lattice points, illustrates the lattice points on the M-Y plane with C=100%, the C-Y plane with M=0%, and the C-M plane with Y=100%, and the illustration of other lattice points is omitted.

An area Ar2 hatched on the C-Y plane is an area in which an ink amount set in which the total of each ink amount of the cyan C and the yellow Y exceeds a duty limit value is disposed. The "duty limit value" means an upper limit value of the total amount of ink that can be discharged in a unit area of the printing medium P. In an ink jet printer, when a large amount of ink is discharged into a unit area of the printing medium P, ink bleeding occurs and suitable color representation cannot be performed, and thus such a limitation is provided. The duty limit value differs depending on a printing condition such as the printing medium P and the type of ink. Further, as the duty limit value, a duty limit value by a single color and a duty limit value by the total of a plurality of colors are predetermined, and it is such that an ink amount of 0% to 100% is set as the duty limit value by a single color, an ink amount of 0% to 200% is set as the duty limit value by a combination of two ink colors, and an ink amount of 0% to the number of colors X 100% is set as the total duty limit value by a combination of an optional number of colors other than those, respectively. In the present embodiment, the ink amount set is determined by using the round-robin combination for a combination of each ink amount of C, M, Y, K, and Or, and is associated with the lattice point of the ink amount space Csp, respectively, but, in the actual printing in the printer 200, the ink amount set associated with each lattice point in the area Ar1 inside the area Ar2 and not exceeding the duty limit value is used.

FIG. 3 is an explanatory diagram illustrating an example of a total combination Acm of the ink amount sets. As described above, one set of ink amount sets is set for each lattice point in the ink amount space Csp. The total combination Acm of the ink amount sets can be obtained by extracting the ink amount set that does not exceed the duty limit value from the round-robin combination of each ink amount of cyan C, magenta M, yellow Y, black K, and orange Or.

Figure 4:
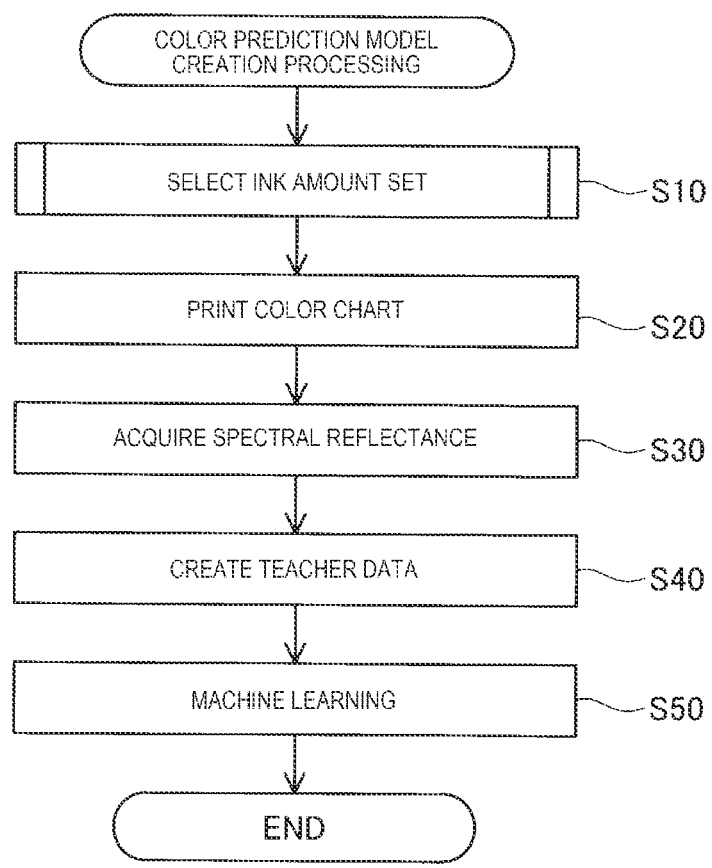
FIG. 4 is a flowchart illustrating a processing procedure of color prediction model creation processing.

FIG. 4 is a flowchart illustrating a processing procedure of color prediction model creation processing. The color prediction model creation processing is started when a user selects an operation menu for executing the color prediction model creation processing on a display portion (not illustrated) included in the color prediction model creation apparatus 100.

In a step S10, the ink amount set selection portion 11 selects an ink amount set. Specifically, the ink amount set selection portion 11 selects an ink amount set that matches a predetermined selection rule in the total combination Acm of the ink amount sets in the ink amount space Csp. In the present embodiment, the ink amount set is selected based on a predetermined selection rule for the following reasons. That is, this is to reduce the labor of printing the color chart and measuring the color by reducing the number of teacher data as compared with the configuration in which the total combination Acm of the ink amount sets is set as the teacher data. Further, when selecting the ink amount set from the total combination Acm of the ink amount sets, for example, it is designed to include more of the ink amount set corresponding to a color such as an achromatic color, a single color, and a color with high lightness, a color gamut, or the like that require more accuracy in color reproduction for print results. In general, this is because there is a tendency that the color prediction accuracy of the ink amount set close to the ink amount set in the teacher data is high while the color prediction accuracy of the ink amount set apart from the ink amount set in the teacher data is low. In the present embodiment, as the selection rule mentioned above, a rule in which more of the ink amount set of the combination of the ink colors defined in the base LUT 24 are selected, is used.

Figure 5:
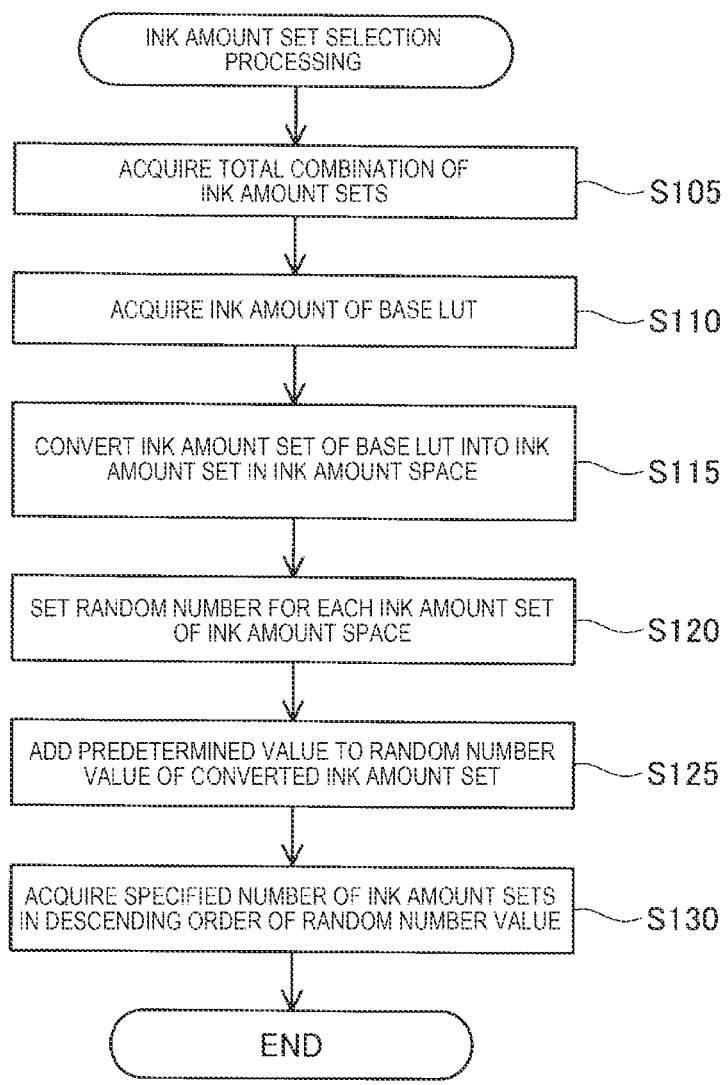
FIG. 5 is a flowchart illustrating a detailed processing procedure of ink amount set selection processing.

FIG. 5 is a flowchart illustrating a detailed processing procedure of ink amount set selection processing. In a step S105, the ink amount set selection portion 11 acquires the total combination of the ink amount sets. Specifically, the combination Acm illustrated in FIG. 3 is acquired.

In a step S110, the ink amount set selection portion 11 acquires the ink amount of the base LUT 24. Specifically, the ink amount set selection portion 11 refers to the storage 20 to acquire the ink amount list stored in the base LUT 24.

In a step S115, the ink amount set selection portion 11 converts the ink amount set of the base LUT 24 into the ink amount set in the ink amount space Csp. Specifically, the ink amount set selection portion 11 converts the ink amount of each ink color in each ink amount set defined in the base LUT 24 into the ink amount (closest value) of the ink amount set associated with the closest lattice point in each ink amount set associated with the lattice point of the ink amount space Csp.

FIG. 6 is an explanatory diagram schematically illustrating how the step S115 is executed. The upper portion of FIG. 6 illustrates a portion of an ink amount list Ls of the base LUT 24, the middle portion thereof illustrates a partial combination Cm1 in the total combination Acm of the ink amount sets in the ink amount space Csp, and the lower portion thereof illustrates the closest value to the ink amount of each ink color in the ink amount space Csp. In the step S115, the ink amount set selection portion 11 searches for an ink amount that approximates the ink amount of each ink color defined in the ink amount set of the base LUT 24 in the ink amount set associated with each lattice point of the ink amount space Csp. For example, in cyan C, since the ink amount of the base LUT 24 is "0 (zero)" as illustrated in the upper portion of FIG. 6, the closest value of the ink amount is "0 (zero)" defined in the first ink amount set as illustrated by hatching in the middle portion of FIG. 6. Further, for example, in magenta M, since the ink amount of the base LUT 24 is "9", the closest value of the ink amount is "7" defined in the second ink amount set as illustrated by hatching in the middle portion of FIG. 6. Similarly, the closest values of the ink amounts of yellow Y, black K, and orange Or are "70" defined in the fourth ink amount set, "0

(zero)" defined in the first ink amount set, "0 (zero)" defined in the first ink amount set, respectively.

As illustrated in FIG. 5, in a step S120, the ink amount set selection portion 11 sets a random number for the ink amount set associated with each lattice point of the ink amount space Csp. Specifically, the ink amount set selection portion 11 assigns a random number value within the range of 0 (zero) to 1 for each ink amount set of the total combination Acm of the ink amount sets. At this time, the ink amount set selection portion 11 may set a random number value only for the ink amount set of the partial combination of the total combination Acm.

In a step S125, the ink amount set selection portion 11 adds a predetermined value to the random number value of the ink amount set converted to the closest value in the step S115 described above. That is, a predetermined value is added to the random number value assigned to the ink amount set (see the lower portion of FIG. 6) including the ink amount of the closest value in each ink amount set in the ink amount space Csp. In the present embodiment, the predetermined value is, for example, 0.5. As the predetermined value, an optional value in the range of 0.4 to 0.6 may be set instead of 0.5, and it may set a larger value as a predetermined value in such a range. This is because, in a step S130 described later, it is possible to easily select an ink amount set to which a predetermined value is added, that is, an ink amount set close to the ink amount set defined in the base LUT 24.

In the step S130, the ink amount set selection portion 11 acquires a specified number of the ink amount sets in descending order of the random number value. The specified number may be predetermined by an experiment or the like, or may be specified by the user. After the execution of the step S130, a step S20 illustrated in FIG. 4 is executed.

In the step S20, the color prediction model creation portion 14 causes the printer 200 to print the color chart. Specifically, the color prediction model creation portion 14 creates a color patch using the ink amount set selected in the step S10 described above, and transmits the color chart data 23 to the printer 200 via the input/output interface 30. The control portion 210 of the printer 200 controls the printing portion 220 to form a printing image of a color chart on the printing medium P.

In the step S30, the spectral reflectance acquisition portion 12 causes the color measurement apparatus 230 to acquire the spectral reflectance of the color chart. Specifically, the color measurement apparatus 230 measures the spectral reflectance R (λ) of the printing image of the color chart formed on the printing medium P, and transmits the color measurement result to the color prediction model creation apparatus 100 via the input/output interface 30.

In a step S40, the teacher data setting portion 13 sets the ink amount set selected in the step S10 and the spectral reflectance acquired in the step S30 as the teacher data.

In a step S50, the color prediction model creation portion 14 creates a color prediction model by performing machine learning using the teacher data. Specifically, the color prediction model creation portion 14 performs learning of the neural network using the combination of the ink amount sets and the spectral reflectance as learning data, predicts the spectral reflectance in an optional ink amount set, and creates a color prediction model.

According to the first embodiment described above, since an ink amount set is selected from the ink amount set associated with each lattice point in the ink amount space Csp according to a predetermined selection rule, the spectral reflectance of the color chart printed on the printing medium P is acquired using the selected ink amount set, and the teacher data is set by setting the selected ink amount set as the input value and setting the acquired spectral reflectance as the output value, the increase in the number of sampling can be suppressed as compared with the configuration in which all of the ink amount sets associated with each lattice point of the ink amount space Csp is used as the teacher data. Further, since the ink amount set is selected according to a predetermined selection rule, the selection rule is set so that more of the ink amount set corresponding to the color or color gamut for which color prediction accuracy is desired are selected, and thus, the color prediction accuracy can be improved.

Since the ink amount set is selected so that the probability that the ink amount set of the combination of the ink colors defined in the base LUT 24, which is a color conversion table in which the CMYK value of the printer is associated with the ink amount set, is selected becomes larger, more of the ink amount set of the ink colors used in the base LOT can be selected. As a result, the color prediction accuracy of the ink color used in the base LUT can be improved.

B. Second Embodiment

Since the color prediction model creation system 500 in the second embodiment is the same as the color prediction model creation system 500 in the first embodiment illustrated in FIG. 1, detailed description thereof will be omitted.

In the color prediction model creation processing in the second embodiment, the ink amount set selection rule in the ink amount set selection processing is different from that in the first embodiment. In the second embodiment, the ink amount set is selected using a selection rule for ensuring the color prediction accuracy of a spot color ink such as orange, red, green, blue, and violet. In the case of an ink set of a commonly used ink color such as cyan C, magenta M, yellow Y, and black K, and a spot color ink used to widen the gamut, which is a color reproduction range, the ink color having a complementary color relationship with the spot color ink may not be defined in the base LUT 24. Therefore, in the present embodiment, by preventing the ink amount set including the ink color that is the complementary color of the spot color ink from being selected as the teacher data, the probability that the ink amount set of the spot color ink is selected as the teacher data is increased, and the color prediction accuracy of the spot color ink is improved.

The "ink color having a complementary color relationship with the spot color ink" mentioned above means an ink color having a hue in which the hue angle with the hue of the spot color ink is in the range of 180°±45° in a predetermined hue circle. The "predetermined hue circle" is, for example, a Munsell hue circle, a PCCS hue circle, an Ostwald hue circle, or the like, and each color such as red, yellow, green, blue, and purple may not be continuously connected. Further, the "ink color having a complementary color relationship" is not limited to an ink color that matches the complementary color, but also includes an ink color that is close to the complementary color.

Figure 7:
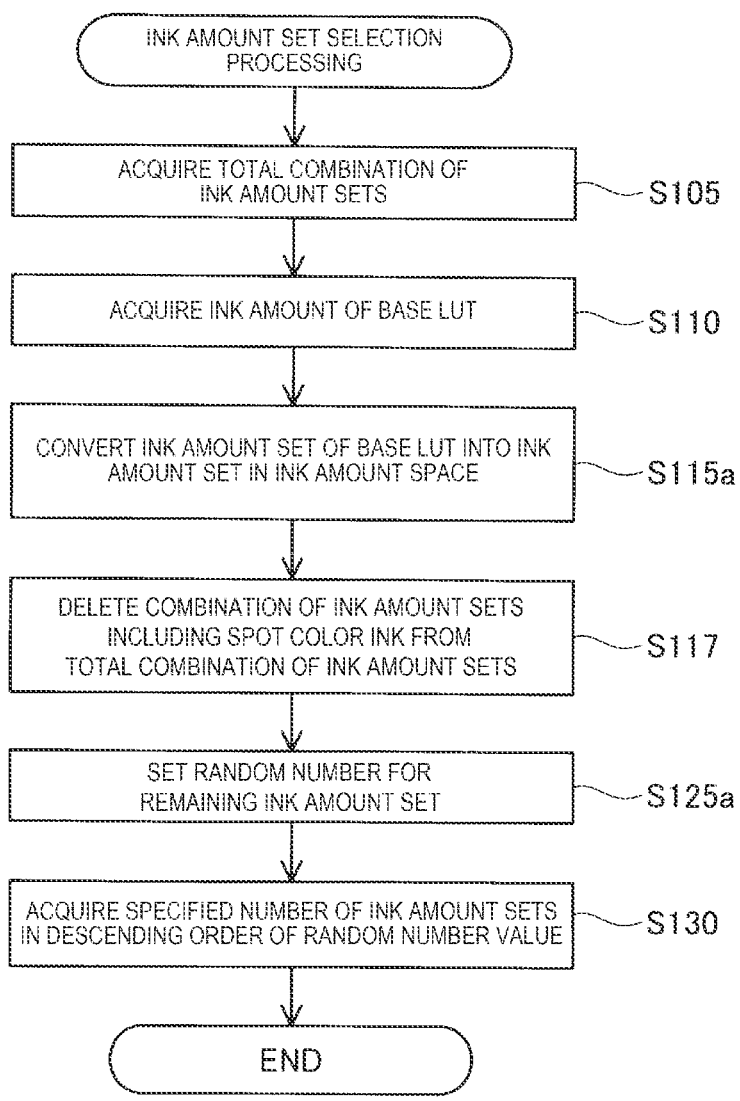
FIG. 7 is a flowchart illustrating a processing procedure of ink amount set selection processing in a second embodiment.

FIG. 7 is a flowchart illustrating a processing procedure of ink amount set selection processing in the second embodiment. The ink amount set selection processing of the second embodiment differs from the ink amount set selection processing of the first embodiment in that a step S115a is executed instead of the step S115, a step S117 is additionally executed, the step S120 is omitted, a step S125a is executed in place of step S125, or the like. Since the other procedures of the ink amount set selection processing of the second embodiment are the same as those of the ink amount set selection processing of the first embodiment, the same procedures are designated by the same reference numerals, and detailed description thereof will be omitted.

As illustrated in FIG. 7, when the ink amount of the base LUT is acquired, in the step S115a, the ink amount set selection portion 11 converts the ink amount set of the base LUT 24 into the ink amount set in the ink amount space Csp. Specifically, for cyan C, magenta M, yellow Y, and black K, the ink amount of the base LUT 24 is converted to the closest value in the ink amount space Csp by the same procedure as in the step S115 described above. Regarding orange Or, which is a spot color ink, when the ink amount of the base LUT 24 is larger than "0 (zero)", the closest value is converted so as not to be "0 (zero)". More specifically, the ink amount set selection portion 11, after removing the ink amount set in which the ink amount of orange Or is "0 (zero)" in the ink amount set associated with each lattice point of the ink amount space Csp, sets the ink amount closest to the ink amount of the base LUT 24 in the remaining ink amount set as the closest value.

FIG. 8 is an explanatory diagram schematically illustrating how the step S115a is executed. The upper portion of FIG. 8 illustrates a portion of the ink amount list Ls of the base LUT 24, the middle portion thereof illustrates the partial combination Cm1 in the total combination Acm of the ink amount sets in the ink amount space Csp, and the lower portion thereof illustrates the closest value to the ink amount in the ink amount space Csp. The ink amount list Ls and the combination Cm1 are the same as those in FIG. 6.

As can be understood by comparing FIGS. 6 and 8, the closest values similar to those in the first embodiment are acquired for cyan C, magenta M, yellow Y, and black K. On the other hand, for orange Or, as illustrated in the middle portion of FIG. 8, the ink amount "0 (zero)" of the first ink amount set is excluded in the ink amounts of 0 (zero), 3, 10, 40, and 100, and the ink amount "3" closest to the ink amount "1" of the base LUT 24 of 3, 10, 40, and 100 is acquired as the closest value (see the lower portion of FIG. 8).

As illustrated in FIG. 7, in the step S117, the ink amount set selection portion 11 deletes the combination of the ink amount sets including the spot color ink from the total combination Acm of the ink amount sets. Specifically, the ink amount set selection portion 11 deletes the combination of the ink amount sets including the orange Or and not acquired as the closest value in the step S115a from the total combination Acm. In this manner, the ink amount set of the spot color ink used in the base LUT 24 remains in the combination Acm, and the complementary color ink amount set of the spot color ink not used in the base LUT 24 is excluded from the combination Acm.

In the step S125a, the ink amount set selection portion 11 sets a random number for the remaining ink amount set. After the execution of the step S125a, the step S130 mentioned above is executed.

According to the second embodiment described above, since the selection rule is determined so that the ink color defined in the base LUT 24 includes orange Or that is the spot color and the ink amount set including the ink color having a complementary color relationship with the spot color is not selected, it is possible to suppress the selection of an ink amount set of an ink color having a complementary color relationship with a spot color, that is, an ink color not defined in the base LUT 24. As a result, the number of data of the ink amount set of the ink colors not defined in the base LUT 24 can be reduced.

C. Third Embodiment

Since the color prediction model creation system 500 in the third embodiment is the same as the color prediction model creation system 500 in the first embodiment illustrated in FIG. 1, detailed description thereof will be omitted.

In the color prediction model creation processing in the third embodiment, the ink amount set selection rule in the ink amount set selection processing is different from that in the first embodiment. In the third embodiment, the ink amount set is selected by using the selection rule for improving the color prediction accuracy of the color on the surface of the gamut. This is because it is important when determining which ink color is combined in which way to reproduce a color outside the color gamut that can be reproduced with the ink color that can be used in the printer. Here, the color on the outer shell surface of the gamut tends to be composed by using the maximum value of the duty limit value mentioned above. Therefore, in the present embodiment, more of the ink amount set close to the duty limit value are selected. Hereinafter, a specific description will be given.

Figure 9:
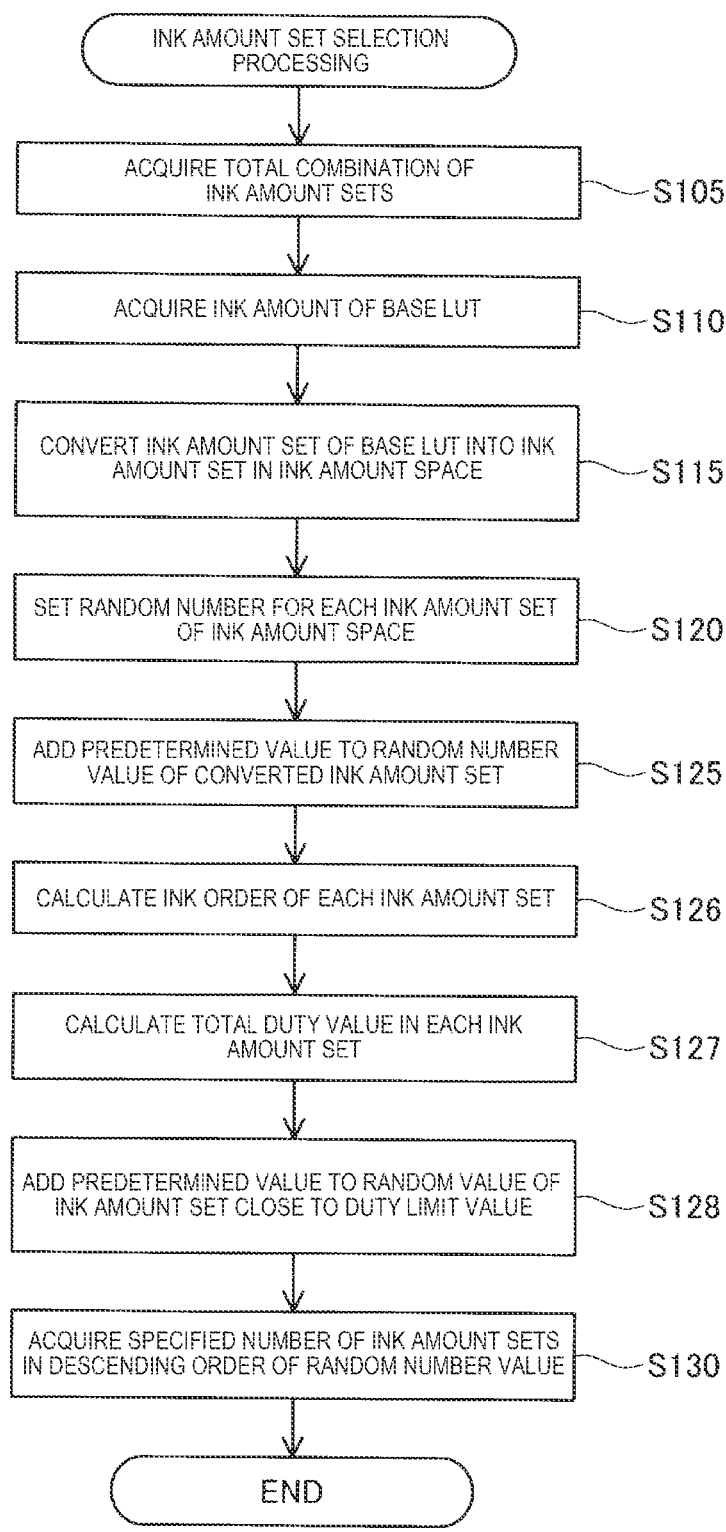
FIG. 9 is a flowchart illustrating a processing procedure of ink amount set selection processing in a third embodiment.

FIG. 9 is a flowchart illustrating a processing procedure of ink amount set selection processing in the third embodiment. The ink amount set selection processing of the third embodiment is different from the ink amount set selection processing of the first embodiment illustrated in FIG. 5 in that steps S126, S127, and S128 are additionally executed. Since the other procedures of the ink amount set selection processing of the third embodiment are the same as those of the ink amount set selection processing of the first embodiment, the same procedures are designated by the same reference numerals, and detailed description thereof will be omitted.

As illustrated in FIG. 9, when the step S125 mentioned above is executed and a predetermined value is added to the random number value of the ink amount set converted in the step S115 mentioned above, the ink amount set selection portion 11 in the step S126 calculates the ink order of each ink amount set. The "ink order" means the number of inks to be mixed, and means the number of ink colors whose ink amount is not 0 (zero) in the ink amount set. In the case of a five-color ink set as in the present embodiment, the ink order is any one from 0 (zero) to 5 including the paper white in which all the ink amounts are zero. For example, when there is one ink color in which the ink amount is not zero, that is, when the ink amount of a single ink color is used, the ink order is "1", which is also called a primary color. Further, for example, when there are two ink colors in which the ink amount is not zero, that is, when an ink amount in which two ink colors are combined is used, the ink order is "2", which is also called a secondary color.

FIG. 10 is an explanatory diagram illustrating an example of an ink amount set and an ink order. In the first and second ink amount sets of FIG. 10, the ink order is "1" because the only ink color in which the ink amount is not zero is orange Or. In the third and fourth ink amount sets, the ink order is "2" because the ink colors in which the ink amount is not zero are two ink colors, magenta M and yellow Y. In the fifth ink amount set, the ink order is "4" because the ink amounts of the four colors excluding orange Or are not zero.

As illustrated in FIG. 9, in the step S127, the ink amount set selection portion 11 calculates the total duty value in each ink amount set. Specifically, as illustrated in the total duty value of FIG. 10, the total value of the ink amount of each ink color is calculated in each ink amount set.

In the step S128, the ink amount set selection portion 11 adds a predetermined value to the random number value of the ink amount set close to the duty limit value. In the present embodiment, the "predetermined value" is set so that the closer the total duty value is to the duty limit value, the larger the value. For example, the example illustrated in the predetermined value 1 in FIG. 10 is an example in which the ratio of the total duty value to the duty limit value is set as the predetermined value. In the example illustrated in FIG. 10, 100% is used as the duty limit value of the primary color, 200% is used as the duty limit value of the secondary color, and 230% is used as the total duty limit value. The example illustrated in a predetermined value 2 of FIG. 10 is an example in which when the total duty value is within the predetermined range, the predetermined value is set to 0.5, and when the total duty value is not within the predetermined range, the predetermined value is set to 0. The "predetermined range" means the range of the duty limit value±25. The predetermined range may be set to other optional ranges by experiments or the like.

After the execution of the step S128, the step S130 mentioned above is executed. As described above, since a larger value is set for the random number value of the ink amount set close to the duty limit value, in the step S130, the ink amount set corresponding to the outer shell of the gamut is more easily selected.

According to the third embodiment described above, since the ink amount set is selected so that the probability that the ink amount set including the ink amount is selected increases as the ink amount approaches the duty limit value, it is possible to select more of the ink amount set that represents the color on the outer shell surface of the gamut. As a result, the color prediction accuracy of the color composing the gamut surface can be improved.

D. Fourth Embodiment

Since the color prediction model creation system 500 in the fourth embodiment is the same as the color prediction model creation system 500 in the first embodiment illustrated in FIG. 1, detailed description thereof will be omitted.

In the color prediction model creation processing in the fourth embodiment, the ink amount set selection rule in the ink amount set selection processing is different from that in the first embodiment. In the fourth embodiment, the ink amount set is selected according to the ink order. Specifically, a selection rule to make it easier to select an ink amount set of an ink order that requires more color prediction accuracy, is used. The ink order that requires more color prediction accuracy is a primary color or a secondary color that is frequently used, and means an ink order that is always defined in the base LUT 24. Therefore, in the present embodiment, the smaller the ink order, the more the ink amount set is selected. Hereinafter, a specific description will be given.

Figures 11, 12:
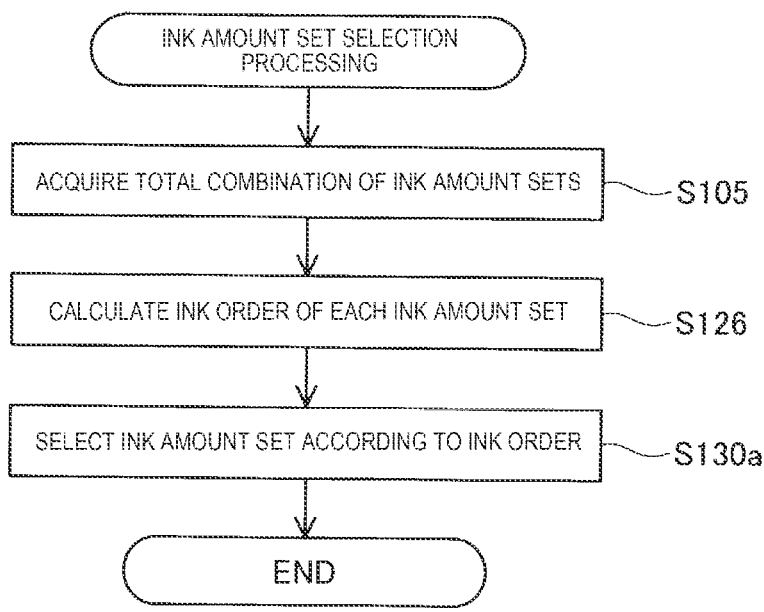
FIG. 11 is a flowchart illustrating a processing procedure of ink amount set selection processing in a fourth embodiment.
FIG. 12 is an explanatory diagram illustrating an example of an ink order and a selection rate of an ink amount set.

FIG. 11 is a flowchart illustrating a processing procedure of ink amount set selection processing in the fourth embodiment. The ink amount set selection processing of the fourth embodiment differs from the ink amount set selection processing of the first embodiment in that the step S126 is additionally executed, the step S110, the step S115, the step S120, and the step S125 are omitted, and a step S130a is executed instead of the step S130. Since the other procedures of the ink amount set selection processing of the fourth embodiment are the same as those of the ink amount set selection processing of the first embodiment, the same procedures are designated by the same reference numerals, and detailed description thereof will be omitted.

As illustrated in FIG. 11, when the total combination Acm of the ink amount sets is acquired, the step S126 mentioned above is executed to calculate the ink order of each ink amount set. In the step S130a, the ink amount set selection portion 11 selects the ink amount set according to the ink order. Specifically, the ink amount set selection portion 11 selects the ink amount set so that the selection rate of the ink amount set with respect to the number of the total combination Acm of the ink amount sets increases as the ink order decreases.

FIG. 12 is an explanatory diagram illustrating an example of an ink order and a selection rate of an ink amount set. In FIG. 12, the parameter indicates the number of the total combination Acm of the ink amount sets, the selection number indicates the number of the ink amount sets to be selected, and the selection rate means the ratio of the selection number to the parameter. As illustrated in FIG. 12, the selection rate of the ink amount set of the primary color is 100%, and the selection rate of the ink amount set of the secondary color is substantially 50%, whereas the selection rates of the ink amount sets of the tertiary color, the quaternary color, and the quinary color are smaller than 10%, and the smaller the ink order, the higher the selection rate. The selection number of each ink order can be set to an optional value based on the parameter and the selection rate.

According to the fourth embodiment described above, since the ink amount set is selected according to the ink order, more of the ink amount set corresponding to the color of the ink order for which the color prediction accuracy is desired to be improved are selected, and thus the color prediction accuracy of the color of the ink order can be improved. Since the ink amount set is selected so that the probability that the ink amount set of the primary color or the ink amount set of the secondary color is selected is higher, more of the ink amount sets of the primary color and the secondary color can be selected. As a result, the color prediction accuracy of the primary color and the secondary color, which have high ratios defined in the base LUT 24, can be improved.

In the fourth embodiment, an ink amount set having an ink order equal to or higher than a predetermined order may not be selected. For example, when the selection number of the ink amount set of the ink order that is the quaternary color or higher is set to 0 (zero), the selection rate of the ink amount set of the ink order that is the quaternary color or higher is set to 0%. In such a configuration, since it is determined not to select the ink amount set of the ink order that is the quaternary color or higher, it is possible to easily select an ink amount set of the ink order that is lower than the quaternary color. Further, it is possible to reduce the number of data of the ink amount set with the quaternary color or higher having a low ratio defined in the base LUT 24. The predetermined order mentioned above is not limited to the quaternary color. That is, in general, an optional configuration can be adopted so that the ink amount space Csp is constituted with the ink amounts of N or more types of inks (N being an integer of two or more), and the ink amount set having the ink order that is an M-nary or higher color (M being an integer of two or more and smaller than N) is not selected.

E. Fifth Embodiment

Since the color prediction model creation system 500 in the fifth embodiment is the same as the color prediction model creation system 500 in the first embodiment illustrated in FIG. 1, detailed description thereof will be omitted.

In the color prediction model creation processing in the fifth embodiment, the ink amount set selection rule in the ink amount set selection processing is different from that in the fourth embodiment. In the fifth embodiment, the ink amount set is selected according to the ink order as in the fourth embodiment, but a selection rule is used that makes it difficult to select the ink amount set as the ink order is higher.

Figure 13:
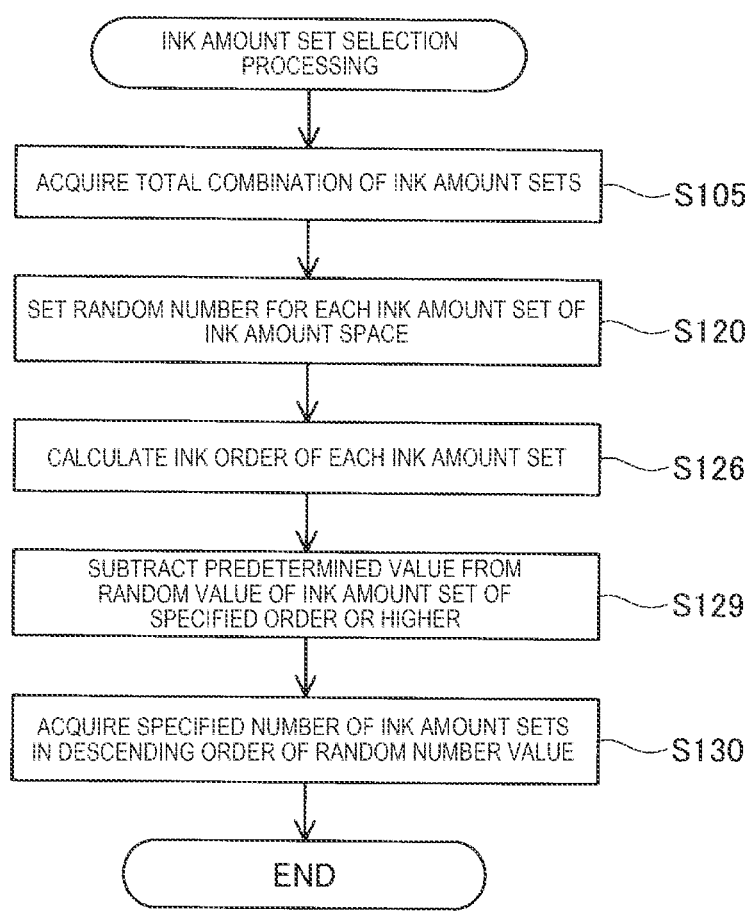
FIG. 13 is a flowchart illustrating a processing procedure of ink amount set selection processing in a fifth embodiment.

FIG. 13 is a flowchart illustrating a processing procedure of ink amount set selection processing in the fifth embodiment. The ink amount set selection processing of the fifth embodiment differs from the ink amount set selection processing of the fourth embodiment illustrated in FIG. 11 in that the step S120 and a step S129 are additionally executed and the step S130 is executed instead of a step S130a. Since the other procedures of the ink amount set selection processing of the fifth embodiment are the same as those of the ink amount set selection processing of the fourth embodiment, the same procedures are designated by the same reference numerals, and detailed description thereof will be omitted.

As illustrated in FIG. 13, when the total combination Acm of the ink amount sets is acquired, the step S120 mentioned above is executed to set a random number in each ink amount set of the ink amount space Csp. Next, the above-mentioned step S126 is executed to calculate the ink order of each ink amount set. In the step S129, the ink amount set selection portion 11 subtracts a predetermined value from the random number value of the ink amount set of the specified order or higher. The specified order can be an ink order not defined in the base LUT 24, and may be, for example, a quaternary color. The predetermined value in the present embodiment is set so that the value increases as the ink order increases. Accordingly, as the ink order becomes larger than the specified order, the value subtracted from the random number value becomes larger. As a result, as the ink order becomes higher than the specified order, the probability that the ink amount set is selected decreases. After the execution of the step S129, the step S130 mentioned above is executed.

According to the fifth embodiment described above, since the ink amount set is selected so that the probability that the ink amount set is selected decreases as the ink order increases, it is possible to increase the probability that the ink amount set having a lower ink order is selected. Therefore, it is possible to improve the color prediction accuracy of a color having a low ink order with a high ratio and defined in the base LUT 24.

F. Sixth Embodiment

Since the color prediction model creation system 500 in the sixth embodiment is the same as the color prediction model creation system 500 in the first embodiment illustrated in FIG. 1, detailed description thereof will be omitted.

In the color prediction model creation processing in the sixth embodiment, the ink amount set selection rule in the ink amount set selection processing is different from that in the first embodiment. In the sixth embodiment, the ink amount set including an ink color that may cause deterioration of the print image quality when the ink color is mixed with other inks is not selected as the teacher data. For example, when a fluorescent ink is mixed with another ink, the color-developing characteristics peculiar to the fluorescent ink disappear. Therefore, the fluorescent ink is usually used alone without being mixed with other ink colors. When the fluorescent ink and other inks are mixed, the ink amount of the other ink colors is reduced. Accordingly, in the present embodiment, the ink amount set of ink having incompatible color characteristics when the ink is combined with other ink colors is excluded from the combination of the ink amount sets.

Specifically, the ink amount set selection portion 11 excludes an ink amount set of a secondary color or higher including fluorescent ink, and the ink amount set in which the ink amount of another ink color is equal to or more than a predetermined threshold value from the total combination Acm of the ink amount sets. The predetermined threshold value may be, for example, the ink amount of the fluorescent ink.

According to the sixth embodiment described above, since the ink amount set is selected so that the ink amount set including the combination of inks having incompatible color characteristics is not selected, it is possible to suppress the ink amount set that is not actually used is selected.

G. Seventh Embodiment

Since the color prediction model creation system 500 in the seventh embodiment is the same as the color prediction model creation system 500 in the first embodiment illustrated in FIG. 1, detailed description thereof will be omitted.

In the color prediction model creation processing in the seventh embodiment, the ink amount set selection rule in the ink amount set selection processing is different from that in the first embodiment. In the seventh embodiment, an L*a*b* color space is divided into predetermined color gamuts, and an ink amount set is selected for each divided color gamut. In the present embodiment, the "predetermined color gamut" is determined according to the lightness, and it means a high-lightness color gamut that is a gamut whose lightness is equal to or higher than a first reference lightness and a low-lightness color gamut that is a gamut whose lightness is lower than or equal to a second reference lightness. Hereinafter, a specific description will be given.

Figure 14:
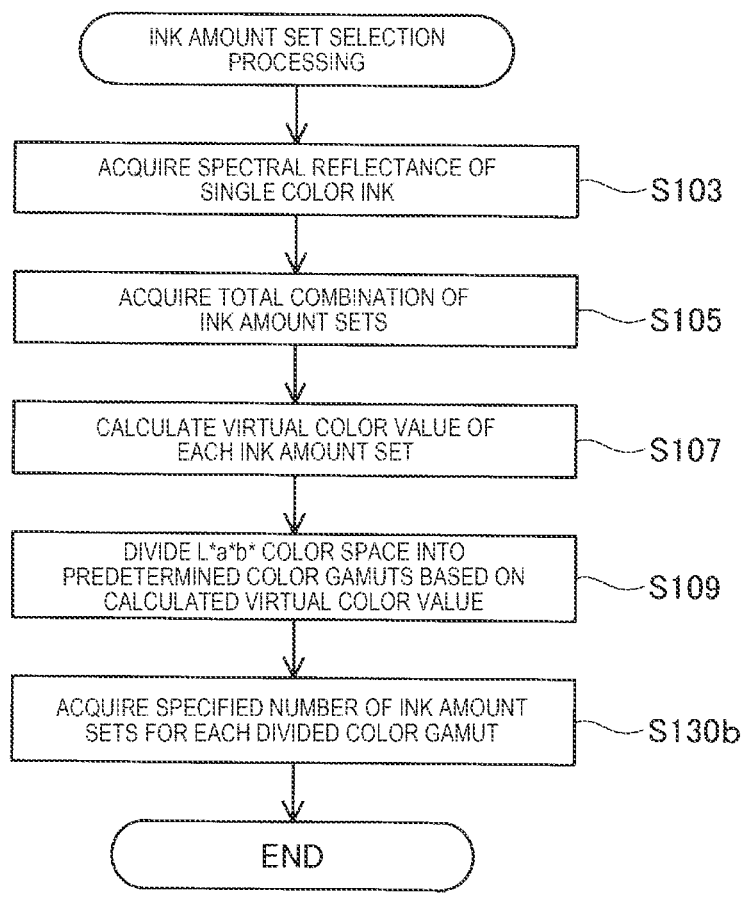
FIG. 14 is a flowchart illustrating a processing procedure of ink amount set selection processing in a seventh embodiment.

FIG. 14 is a flowchart illustrating a processing procedure of the ink amount set selection processing in the seventh embodiment.

As illustrated in FIG. 14, when the ink amount set selection processing is started, the ink amount set selection portion 11 acquires the spectral reflectance of a single color ink in a step S103. Specifically, first, the ink amount set selection portion 11 creates a single color patch using the representative ink amount of a single color ink, and causes the printer 200 to print the created single color patch. Next, the ink amount set selection portion 11 causes the color measurement apparatus 230 to acquire the spectral reflectance of the single color patch. The spectral reflectance of the single color ink may be acquired in advance and stored in the storage 20, and the spectral reflectance may be read out. After the execution of the step S103, the step S105 mentioned above is executed.

In a step S107, the ink amount set selection portion 11 calculates the virtual color value of each ink amount set. In the present embodiment, the virtual color values (L* value, a* value, and b* value) when observed with standard light D50 are calculated. For example, the virtual color value of mixed colors is calculated by the following procedure. Specifically, the ink amount set selection portion 11 calculates the reflectance of the corresponding ink amount by using the spectral reflectance of the acquired single color ink. Next, the ink amount set selection portion 11 multiplies the calculated reflectance for each wavelength. The ink amount set selection portion 11 converts the spectral reflectance into tristimulus values XYZ by using a color matching function for the value obtained by multiplication, and converts the obtained tristimulus values XYZ to the L*a*b* values.

In a step S109, the ink amount set selection portion 11 divides the L*a*b* color space into predetermined color gamuts based on the calculated virtual color value. Specifically, the ink amount set selection portion 11 divides, for example, an area having the L* value indicating the lightness of 70 or more, as a high-lightness color gamut mentioned above. Further, the ink amount set selection portion 11 divides, for example, an area having the L* value indicating the lightness of 40 or less, as a low-lightness color gamut mentioned above. Further, the ink amount set selection portion 11 divides, for example, an area having the L* value indicating the lightness that is larger than 40 and smaller than 70, as a medium-lightness color gamut.

In a step S130b, the ink amount set selection portion 11 acquires a specified number of the ink amount sets for each divided color gamut. In the present embodiment, the specified number is determined for each color gamut, and for example, the specified number of the high-lightness color gamut is set to 100, and the specified numbers of the medium-lightness color gamut and the low-lightness color gamut are set to 50. The ink amount set selection portion 11 selects the specified number of the ink amount sets from each color gamut.

According to the seventh embodiment described above, since the L*a*b* color space is divided into predetermined color gamuts and the ink amount set is selected for each color gamut, it is possible to perform sampling in which the color gamut is taken into consideration. Since the predetermined color gamuts are the high-lightness color gamut in which the lightness is equal to or higher than a reference lightness and the low-lightness color gamut in which the lightness is equal to or lower than a reference lightness, it is possible to perform sampling for each of the high-lightness color gamut and the low-lightness color gamut.

In the seventh embodiment, the predetermined color gamut may be an achromatic color gamut. Specifically, in the step S109 described above, the area of the color represented only by the L* value indicating the lightness, that is, the area of the color in which the a* value and the b* value indicating the hue and saturation are zero, may be divided.

In the seventh embodiment, the predetermined color gamut may be evenly divided in the L*a*b* color space. Specifically, in the step S109 described above, by dividing the L* value indicating lightness into 20 values from 0 (zero) to 100 and dividing the a* value and the b* value indicating hue and saturation into 32 values from −128 to 128, the L*a*b* color space may be evenly divided. In such a configuration, since the predetermined color gamuts are evenly divided in the L*a*b* color space, the entire L*a*b* color space can be comprehensively sampled and each color gamut can be sampled evenly.

H. Eighth Embodiment

Figure 15:
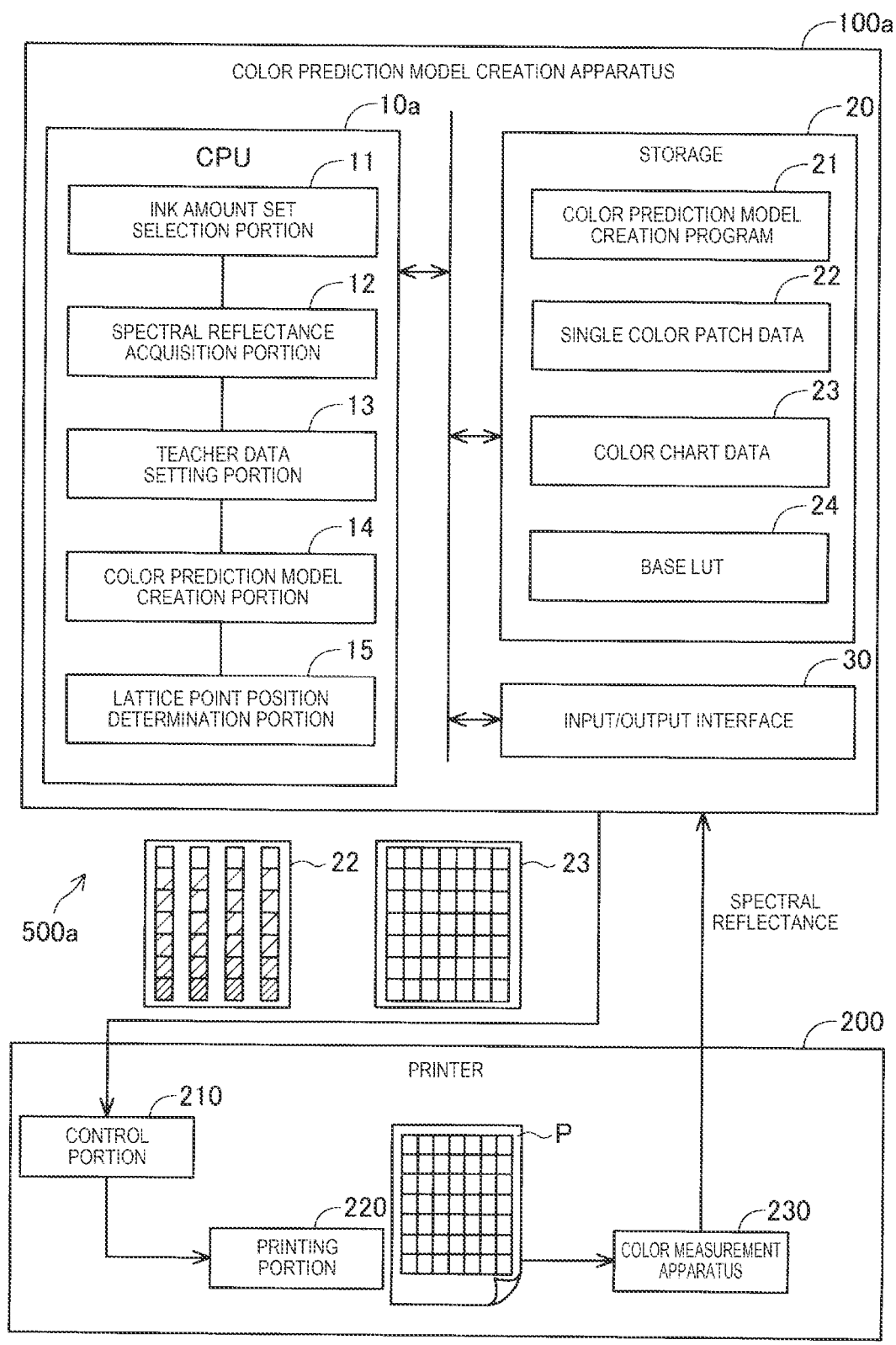
FIG. 15 is a block diagram illustrating a schematic configuration of a color prediction model creation system in an eighth embodiment.

FIG. 15 is a block diagram illustrating a schematic configuration of a color prediction model creation system 500a according to the eighth embodiment. Since the color prediction model creation system 500a is different from the first embodiment in that a CPU 10a of a color prediction model creation apparatus 100a also functions as a lattice point position determination portion 15 and other configurations are the same as those of the first embodiment, the same components are designated by the same reference numerals, and detailed description thereof will be omitted.

The lattice point position determination portion 15 determines the position of the lattice point in the ink amount space Csp. Specifically, the lattice point position determination portion 15 determines the position of each lattice point so that a plurality of lattice points are disposed in the ink amount space Csp, and then, in a predetermined range in the ink amount space Csp, adds a predetermined number of lattice points so that the interval between the lattice points becomes small and determines the position of the added lattice point. In the present embodiment, the "predetermined range" means the range with which an ink amount smaller than the predetermined duty value is associated, and is also referred to as a "low duty portion". This is done in order to improve the color prediction accuracy of a high duty portion by increasing the data of the ink amount set by making the lattice point interval smaller because the color change is likely to be large in the low duty portion. Contrary to the low duty portion, the range with which the ink amount larger than the predetermined duty value in the ink amount space Csp is associated is also referred to as the "high duty portion".

Figure 16:
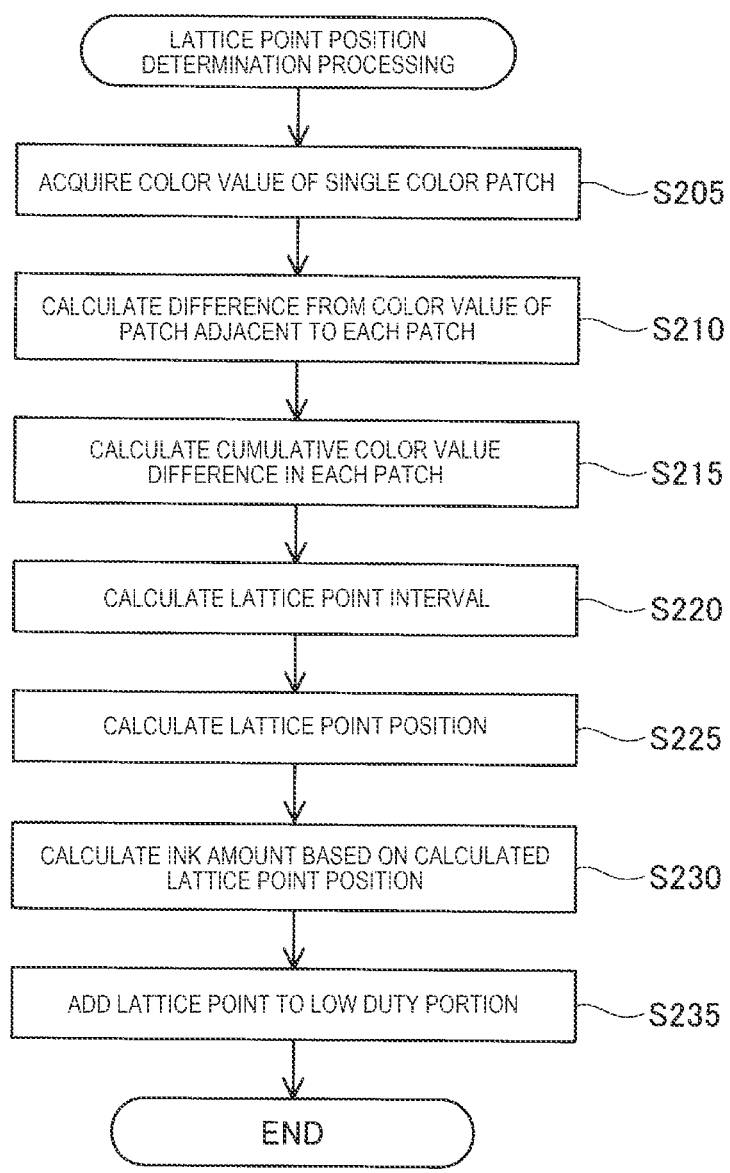
FIG. 16 is a flowchart illustrating a processing procedure of lattice point position determination processing.

FIG. 16 is a flowchart illustrating a processing procedure of lattice point position determination processing. The lattice point position determination processing is first executed when the color prediction model creation processing is started. In a step S205, the lattice point position determination portion 15 acquires the color value of the single color patch. Specifically, the lattice point position determination portion 15 measures the color value of the single color patch by the same procedure as in the step S103 described above, and acquires the L*a*b* values as the color value of the single color patch.

In a step S210, the lattice point position determination portion 15 calculates a difference ΔE from the color values of other patches adjacent to each patch. In a step S215, the lattice point position determination portion 15 calculates the cumulative color value difference in each patch. Specifically, the lattice point position determination portion 15 obtains the cumulative color value difference by adding the differences ΔE between the color values calculated in the step S210 described above.

Figures 17, 18:
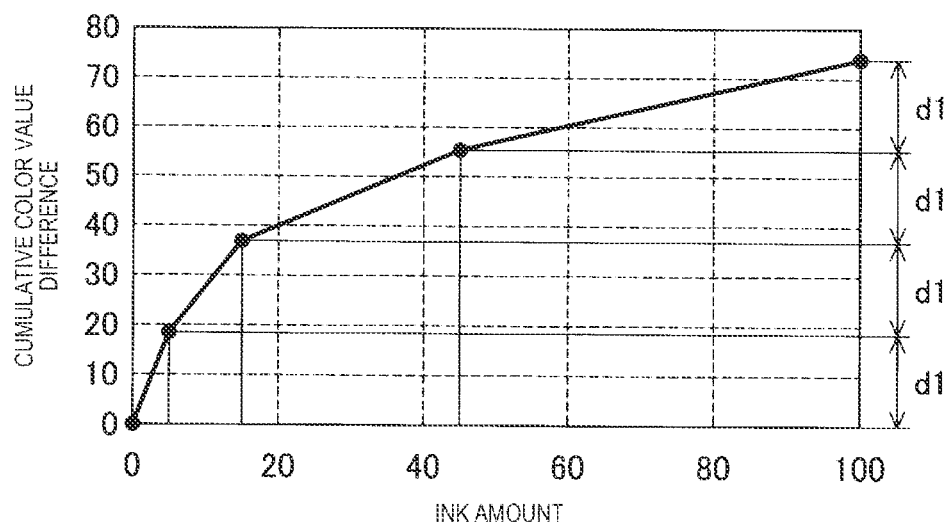
FIG. 17 is an explanatory diagram illustrating an example of a cumulative color value difference.
FIG. 18 is an explanatory diagram illustrating the relationship between the cumulative color value difference of cyan and an ink amount.

FIG. 17 is an explanatory diagram illustrating an example of the cumulative color value difference. FIG. 17 illustrates an example in which five cumulative color value differences of 0 (zero), 18.5, 37, 55.5, and 74 are calculated as the cumulative color value difference of cyan C.

In a step S220, the lattice point position determination portion 15 calculates a lattice point interval using the following Equation 1.

Lattice point interval=Maximum cumulative color value difference÷(Number of lattice points to be obtained−1−Number of lattice points to be added) (1)

In the Equation 1, the maximum cumulative color value difference is the maximum cumulative color value difference among the cumulative color value differences calculated in the step S215, and is "74" in the example illustrated in FIG. 17. The number of lattice points to be obtained is the total number of lattice points disposed in the ink amount space Csp, and is set to "6" in the present embodiment. The number of lattice points to be added is the number of lattice points to be added to the low duty portion, and is set to "1" in the present embodiment. Accordingly, in the example illustrated in FIG. 17, "18.5" is acquired as the lattice point interval.

In a step S225, the lattice point position determination portion 15 calculates the lattice point position. Specifically, the lattice point position determination portion 15 sequentially associates a value with a small cumulative color value difference starting with the first lattice point (see FIG. 17). In a step S230, the lattice point position determination portion 15 calculates the ink amount based on the calculated lattice point position. Specifically, the lattice point position determination portion 15 calculates the ink amount by interpolation from the cumulative color value difference with respect to the ink amount of the single color patch used in the step S205 described above and the lattice point position.

FIG. 18 is an explanatory diagram illustrating the relationship between the cumulative color value difference of cyan C and an ink amount. In FIG. 18, the vertical axis represents the cumulative color value difference of cyan C, and the horizontal axis represents the ink amount. The black circles in FIG. 18 are the ink amounts corresponding to the above-mentioned five cumulative color value differences calculated in the step S230. An interval dl in the figure is the lattice point interval calculated in the step S220 described above.

As illustrated in FIG. 16, in a step S235, the lattice point position determination portion 15 adds a lattice point to the low duty portion. Specifically, the lattice point position determination portion 15 adds a lattice point at a position where the lattice point interval is substantially ½ in the range of ink amount from 0 (zero) % to 20%. In the examples illustrated in FIGS. 17 and 18, since the lattice point interval is 18.5, a lattice point is added at a position which is between the first lattice point and the second lattice point and where the interval between the two lattice points is 9.

FIG. 19 is an explanatory diagram illustrating an example of a cumulative color value difference after a lattice point is added to a low duty portion. FIG. 19 is a diagram corresponding to FIG. 17. As can be understood by comparing FIG. 17 and FIG. 19, a lattice point is added at the position where the cumulative color value difference is substantially ½, between the first lattice point illustrated in FIG. 17 and the second lattice point illustrated in FIG. 17. Therefore, the lattice point in the low duty portion is disposed so as to be small as compared with the interval between the lattice points in the other portions.

After the execution of the step S235, the lattice point position determination processing is ended, and the step S10 mentioned above (see FIG. 4) of the color prediction model creation processing is executed.

According to the eighth embodiment described above, since the position of the lattice point is determined so that each of the intervals between the lattice points in the low duty portion is smaller than each of the intervals between the lattice points in the high duty portion, the number of lattice points disposed in the low duty portion can be increased as compared with the number of lattice points disposed in the high duty portion. As a result, since the number of data of the ink amount set in the low duty portion increases, the color prediction accuracy in the low duty portion can be improved.

I. Ninth Embodiment

Since the color prediction model creation system 500a in the ninth embodiment is the same as the color prediction model creation system 500a in the eighth embodiment illustrated in FIG. 15, detailed description thereof will be omitted.

The lattice point position determination portion 15 of the ninth embodiment determines the position of the lattice point to be added so that the cumulative color value difference is equal to or less than a predetermined threshold value when the lattice point is added to the low duty portion.

Figure 20:
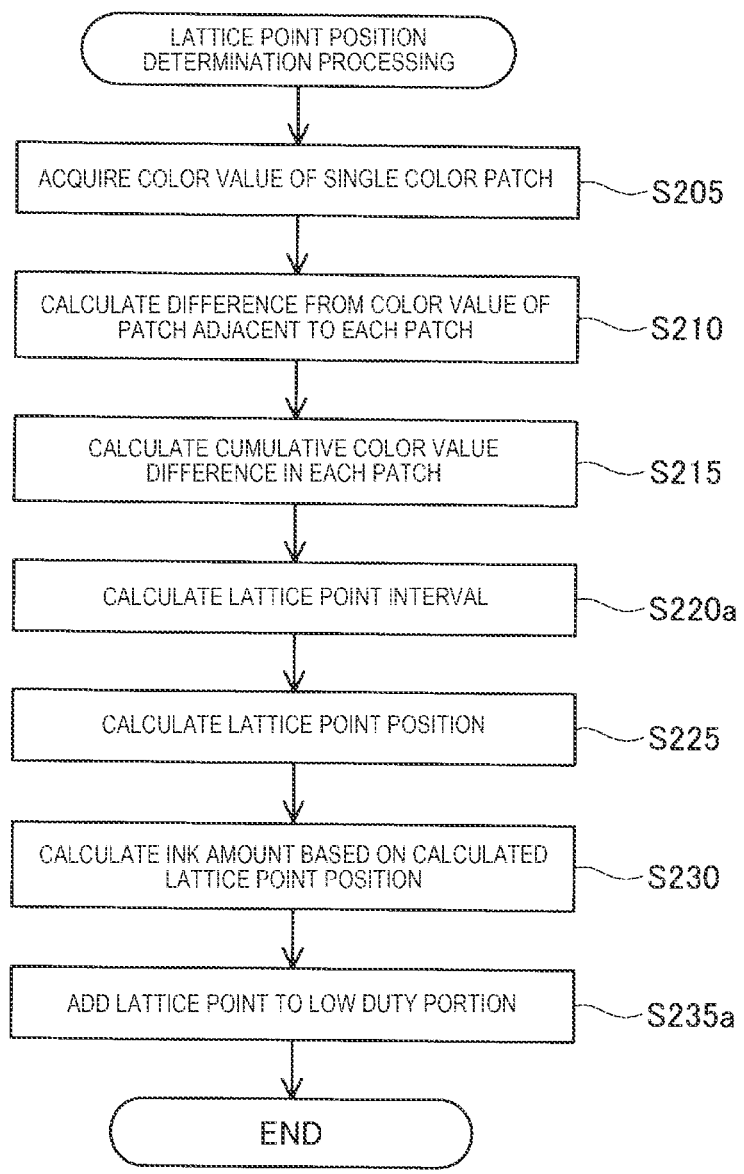
FIG. 20 is a flowchart illustrating a processing procedure of lattice point position determination processing according to a ninth embodiment.

FIG. 20 is a flowchart illustrating a processing procedure of lattice point position determination processing in the ninth embodiment. The lattice point position determination processing of the ninth embodiment differs from the lattice point position determination processing of the eighth embodiment in that a step S220a is executed instead of the step S220 and a step S235a is executed instead of the step S235. Since the other procedures of the lattice point position determination processing of the ninth embodiment are the same as those of the lattice point position determination processing of the eighth embodiment, the same procedures are designated by the same reference numerals, and detailed description thereof will be omitted.

When the step S215 mentioned above is executed and the cumulative color value difference in each patch is calculated, in the step S220a, the lattice point position determination portion 15 calculates the lattice point interval using the following Equation 2. In the following description, it is assumed that the cumulative color value difference illustrated in FIG. 17 is calculated in the same manner as in the eighth embodiment described above.

Lattice point interval=Maximum cumulative color value difference÷(Number of temporary lattice points−Number of lattice points to be added)    (2)

The Equation 2 is different from the Equation 1 mentioned above in that the number of temporary lattice points is used instead of the number of lattice points to be obtained. The number of temporary lattice points is the temporary total number of lattice points disposed in the ink amount space Csp, and is set to "6" in the present embodiment. Accordingly, "18.5" is acquired as the lattice point interval.

After the execution of the step S220a, the step S225 and the step S230 mentioned above are executed. In the step S235a, the lattice point position determination portion 15 adds a lattice point to the low duty portion. Specifically, the lattice point position determination portion 15 adds the lattice point so that the cumulative color value difference of the low duty portion is equal to or less than a predetermined threshold value, for example, "5".

FIG. 21 is an explanatory diagram illustrating an example of a cumulative color value difference after a lattice point is added to a low duty portion. FIG. 21 is a diagram corresponding to FIG. 19. As can be understood by comparing FIG. 17 and FIG. 21, two lattice points are added at a position where the cumulative color value difference is equal to or less than a predetermined threshold value, "4", between the first lattice point illustrated in FIG. 17 and the second lattice point illustrated in FIG. 17. Therefore, the lattice point in the low duty portion is disposed so as to be smaller than the interval between the lattice points in the other portions. In the Equation 2 described above, the number of temporary lattice points is "6", but as illustrated in FIG. 21, in order that the cumulative color value difference is equal to or less than a predetermined value, the number of lattice points may be greater than the number of temporary lattice points as a result.

According to the ninth embodiment described above, since each of the intervals between the lattice points in the low duty portion determines the position of the lattice point so that the cumulative color value difference is equal to or less than a predetermined threshold value, the interval between the lattice points in the low duty portion can be made to be smaller more explicitly.

J. Other Embodiments (1) In each of the embodiments mentioned above, the ink amount set selection portion 11 may select an ink amount set by using a machine learning model for selecting an ink amount set. In such a configuration, the ink amount set can be easily and accurately selected.

(2) In each of the embodiments mentioned above, the printer 200 prints using five color inks of cyan C, magenta M, yellow Y, black K, and orange Or, but may print using other inks such as light cyan, light magenta, light black, green, and violet. Further, the printer 200 may be an inkjet printer of the sublimation transfer type, an ink jet printer of the print dyeing type, or a laser printer that performs printing by adhering color toner on the printing medium P.

(3) In each of the embodiments mentioned above, it is configured such that the color prediction model creation apparatus 100 and the printer 200 are separated from each other, but the printer 200 may incorporate the function of the color prediction model creation apparatus 100.

K. Other Aspects (1) According to a first aspect of the present disclosure, there is provided a method of creating teacher data used for creating a color prediction model that predicts a spectral reflectance of a printed matter printed using an ink amount set from the ink amount set that is a combination of ink amounts of inks used for printing. The method of creating teacher data includes, in an ink amount space in which a plurality of lattice points are disposed, selecting an ink amount set from an ink amount set associated with each lattice point, according to a predetermined selection rule, acquiring a spectral reflectance of a color chart printed on a printing medium using the selected ink amount set, and setting the teacher data using the selected ink amount set as an input value and the acquired spectral reflectance as an output value.

According to the method of creating teacher data of the aspect, since an ink amount set is selected from the ink amount set associated with each lattice point in the ink amount space according to a predetermined selection rule, the spectral reflectance of the color chart printed on the printing medium is acquired using the selected ink amount set, and the teacher data is set by setting the selected ink amount set as the input value and setting the acquired spectral reflectance as the output value, the increase in the number of sampling can be suppressed as compared with the configuration in which all of the ink amount sets associated with each lattice point of the ink amount space is used as the teacher data. Further, since the ink amount set is selected according to a predetermined selection rule, the selection rule is set so that more of the ink amount set corresponding to the color or color gamut for which color prediction accuracy is desired are selected, and thus, the color prediction accuracy can be improved.

(2) In the method of creating teacher data of the aspect, the selection rule may be determined so that a probability that an ink amount set of a combination of ink colors defined in a base LUT for converting a color value of an apparatus-dependent color system into an ink amount is selected is higher.

According to the method of creating teacher data of the aspect, since the ink amount set is selected so that the probability that the ink amount set of the combination of the ink colors defined in the base LUT for converting a color value of an apparatus-dependent color system into an ink amount is selected is higher, more of the ink amount set of the ink colors used in the base LUT can be selected. As a result, the color prediction accuracy of the ink color used in the base LUT can be improved.

(3) In the method of creating teacher data of the aspect, the ink color defined in the base LUT may include a predetermined spot color, and the selection rule may be determined not to select an ink amount set including an ink color having a complementary color relationship with the spot color.

According to the method of creating teacher data of the aspect, since the selection rule is determined so that the ink color defined in the base LUT includes a predetermined spot color and the ink amount set including the ink color having a complementary color relationship with the spot color is not selected, it is possible to suppress the selection of an ink amount set of an ink color having a complementary color relationship with a spot color, that is, an ink color not defined in the base LUT. As a result, the number of data of the ink amount set of the ink colors not defined in the base LUT can be reduced.

(4) In the method of creating teacher data of the aspect, the selection rule may be determined so that as the ink amount approaches a duty limit value, a probability that an ink amount set including the ink amount is selected increases.

According to the method of creating teacher data of the aspect, since the ink amount set is selected so that the probability that the ink amount set including the ink amount is selected increases as the ink amount approaches the duty limit value, it is possible to select more of the ink amount set that represents the color on the outer shell surface of the gamut. As a result, the color prediction accuracy of the color composing the gamut surface can be improved.

(5) In the method of creating teacher data in the aspect, the selection rule may be determined to divide an L*a*b* color space into predetermined color gamuts and select the ink amount set for each color gamut.

According to the method of creating teacher data in the aspect, since the L*a*b* color space is divided into predetermined color gamuts and the ink amount set is selected for each color gamut, it is possible to perform sampling in which the color gamut is taken into consideration. Accordingly, it is possible to explicitly perform sampling of the color gamut for which the color prediction accuracy is desired to be improved.

(6) In the method of creating teacher data of the aspect, the predetermined color gamut may be at least one of a color gamut in which lightness is equal to or higher than a reference lightness, a color gamut in which the lightness is equal to or lower than the reference lightness, and an achromatic color gamut.

According to the method of creating the teacher data of the aspect, since the predetermined color gamut is at least one of a color gamut in which lightness is equal to or higher than a reference lightness, a color gamut in which the lightness is equal to or lower than the reference lightness, and an achromatic color gamut, sampling can be performed for each spot color gamut.

(7) In the method of creating teacher data of the aspect, the predetermined color gamut may be evenly divided in the L*a*b* color space.

According to the method of creating the teacher data of the aspect, since the predetermined color gamuts are evenly divided in the L*a*b* color space, the entire L*a*b* color space can be comprehensively sampled. In addition, each color gamut can be sampled evenly.

(8) In the method of creating teacher data of the aspect, the ink amount space may be constituted with ink amounts of at least two or more types of inks, and the selection rule may determine an ink amount set to be selected according to an ink order that is the number of inks to be mixed.

According to the method of creating the teacher data of the aspect, since the ink amount space is constituted with ink amounts of at least two or more types of inks and the ink amount set is selected according to the ink order, more of the ink amount set corresponding to the color of the ink order for which the color prediction accuracy is desired to be improved are selected, and thus the color prediction accuracy of the color of the ink order can be improved.

(9) In the method of creating teacher data of the aspect, the selection rule may be determined so that a probability that an ink amount set with the ink order of a primary color or an ink amount set with the ink order of a secondary color is selected is higher.

According to the method of creating the teacher data of the aspect, since the ink amount set is selected so that the probability that the ink amount set of the primary color or the ink amount set of the secondary color is selected is higher, more of the ink amount sets of the primary color and the secondary color can be selected. As a result, the color prediction accuracy of the primary color and the secondary color, which have high ratios defined in the base LUT, can be improved.

(10) In the method of creating teacher data of the aspect, the ink amount space may be constituted with ink amounts of N or more types of inks (N being an integer of two or more), and the selection rule may be determined not to select an ink amount set of the ink order of an M-nary or higher color (M being an integer of two or more and smaller than N).

According to the method of creating the teacher data of the aspect, since it is determined not to select the ink amount set of the ink order that is the M-nary color or higher, it is possible to easily select an ink amount set of the ink order that is lower than the M-nary color. Further, it is possible to reduce the number of data of the ink amount set with the M-nary color or higher having a low ratio defined in the base LUT.

(11) In the method of creating teacher data of the aspect, the selection rule may be determined so that a probability that the ink amount set is selected decreases as the ink order increases.

According to the method of creating the teacher data of the aspect, since the ink amount set is selected so that the probability that the ink amount set is selected decreases as the ink order increases, it is possible to increase the probability that the ink amount set having a lower ink order is selected. Therefore, it is possible to improve the color prediction accuracy of a color having a low ink order with a high ratio and defined in the base LUT.

(12) In the method of creating teacher data of the aspect, the selection rule may be determined not to select an ink amount set that includes a combination of inks with incompatible color characteristics.

According to the method of creating the teacher data of the aspect, since the ink amount set is selected so that the ink amount set including the combination of inks having incompatible color characteristics is not selected, it is possible to suppress the ink amount set that is not actually used is selected.

(13) In the method of creating teacher data of the aspect, creating a learning model for selecting the ink amount set may be further included.

According to the method of creating the teacher data of the aspect, since the learning model for selecting the ink amount set is created, the ink amount set can be selected easily and accurately.

(14) In the method of creating teacher data of the aspect, determining a position of each lattice point in the ink amount space may be further included, in which in the determining the position of the lattice point, the position of the lattice point may be determined so that each of intervals between the lattice points in a range, which is a predetermined range in the ink amount space and with which an ink amount smaller than a predetermined duty value is associated, is smaller than the intervals in a range with which an ink amount larger than the predetermined duty value is associated.

According to the method of creating the teacher data of the aspect, since the position of the lattice point is determined so that each of intervals between the lattice points in a range, with which an ink amount smaller than a predetermined duty value is associated, is smaller than each of intervals between the lattice points in a range with which an ink amount larger than the predetermined duty value is associated, the number of lattice points disposed in a range, with which an ink amount smaller than a predetermined duty value is associated, can be increased as compared with the number of lattice points disposed in a range with which an ink amount larger than the predetermined duty value is associated. As a result, since the number of data of the ink amount set in a range, with which an ink amount smaller than a predetermined duty value is associated, increases, the color prediction accuracy can be improved in a range with which an ink amount larger than the predetermined duty value is associated.

(15) In the method of creating teacher data of the aspect, determining a position of each lattice point in the ink amount space may be further included, in which in the determining the position of the lattice point, with each of intervals between the lattice points in a range, which is a predetermined range in the ink amount space and with which an ink amount smaller than a predetermined duty value is associated, the position of the lattice point is determined so that a difference in a color value of each of printed matters printed using an ink amount set associated with each lattice point is equal to or less than a predetermined value.

According to the method of creating teacher data of the aspect, since with each of intervals between the lattice points in a range, which is a predetermined range in the ink amount space and with which an ink amount smaller than a predetermined duty value is associated, the position of the lattice point is determined so that a difference in a color value of each of printed matters printed using an ink amount set associated with each lattice point is equal to or less than a predetermined value, it is possible to more explicitly reduce the interval between the lattice points in a range with which an ink amount smaller than a predetermined duty value is associated.

(16) According to a second aspect of the present disclosure, a color prediction model creation apparatus is provided. The color prediction model creation apparatus includes a color prediction model creation portion that creates a color prediction model by performing machine learning using teacher data created by the method of creating teacher data according to the first aspect.

(17) According to a third aspect of the present disclosure, a method of creating a color prediction model is provided. The method of creating a color prediction model includes creating a color prediction model by performing machine learning using teacher data created by the method of creating teacher data according to the first aspect.

(18) In each of the above embodiments, some of the configuration realized by the hardware may be replaced with software, and conversely, some of the configuration realized by the software may be replaced with the hardware. Further, when some or all of the functions of the present disclosure are realized by software, the software (computer program) can be provided in a form stored in a computer-readable recording medium. In the present disclosure, the "computer-readable recording medium" is not limited to a portable recording medium such as a flexible disk or a CD-ROM, but also includes an internal storage apparatus in a computer such as various RAMs or ROMs, or an external storage apparatus that is fixed to a computer such as a hard disk. That is, the term "computer-readable recording medium" has a broad meaning including an optional recording medium on which data can be fixed rather than temporarily.

The present disclosure is not limited to the embodiment mentioned above, and can be realized by various configurations within a range not deviating from the gist thereof. For example, the technical features in the embodiments corresponding to the technical features in each form described in the column of the outline of the disclosure may be replaced or combined as appropriate to solve some or all of the problems mentioned above, or achieve some or all of the effects mentioned above. Further, when the technical feature is not described as essential in the present specification, it can be appropriately deleted.

What is claimed is:

1. A method of creating teacher data used for creating a color prediction model that predicts a spectral reflectance of a printed matter printed using an ink amount set from the ink amount set that is a combination of ink amounts of inks used for printing, the method comprising:
    in an ink amount space in which a plurality of lattice points are disposed, selecting an ink amount set from an ink amount set associated with each lattice point, according to a predetermined selection rule;
    acquiring a spectral reflectance of a color chart printed on a printing medium using the selected ink amount set; and
    setting the teacher data using the selected ink amount set as an input value and the acquired spectral reflectance as an output value.

2. The method of creating teacher data according to claim 1, wherein
    the selection rule is determined so that a probability that an ink amount set of a combination of ink colors defined in a base LUT for converting a color value of an apparatus-dependent color system into an ink amount is selected is higher.

3. The method of creating teacher data according to claim 2, wherein
    the ink color defined in the base LUT includes a predetermined spot color, and
    the selection rule is determined not to select an ink amount set including an ink color having a complementary color relationship with the spot color.

4. The method of creating teacher data according to claim 2, wherein
    the selection rule is determined so that as the ink amount approaches a duty limit value, a probability that an ink amount set including the ink amount is selected increases.

5. The method of creating teacher data according to claim 1, wherein
    the selection rule is determined to divide an L*a*b* color space into predetermined color gamuts and select the ink amount set for each color gamut.

6. The method of creating teacher data according to claim 5, wherein
    the predetermined color gamut is at least one of a color gamut in which lightness is equal to or higher than a reference lightness, a color gamut in which the lightness is equal to or lower than the reference lightness, and an achromatic color gamut.

7. The method of creating teacher data according to claim 5, wherein
    the predetermined color gamut is evenly divided in the L*a*b* color space.

8. The method of creating teacher data according to claim 1, wherein
    the ink amount space is constituted with ink amounts of at least two or more types of inks, and
    the selection rule determines an ink amount set to be selected according to an ink order that is the number of inks to be mixed.

9. The method of creating teacher data according to claim 8, wherein
    the selection rule is determined so that a probability that an ink amount set with the ink order of a primary color or an ink amount set with the ink order of a secondary color is selected is higher.

10. The method of creating teacher data according to claim 8, wherein
    the ink amount space is constituted with ink amounts of N or more types of inks (N being an integer of two or more), and
    the selection rule is determined not to select an ink amount set of the ink order of an M-nary or higher color (M being an integer of two or more and smaller than N).

11. The method of creating teacher data according to claim 8, wherein
    the selection rule is determined so that a probability that the ink amount set is selected decreases as the ink order increases.

12. The method of creating teacher data according to claim 8, wherein
    the selection rule is determined not to select an ink amount set that includes a combination of inks with incompatible color characteristics.

13. The method of creating teacher data according to claim 1, the method further comprising:
    creating a learning model for selecting the ink amount set.

14. The method of creating teacher data according to claim 1, the method further comprising:
    determining a position of each lattice point in the ink amount space, wherein
    in the determining the position of the lattice point, the position of the lattice point is determined so that each of intervals between the lattice points in a range, which is a predetermined range in the ink amount space and with which an ink amount smaller than a predetermined duty value is associated, is smaller than the intervals in a range with which an ink amount larger than the predetermined duty value is associated.

15. The method of creating teacher data according to claim 1, the method further comprising:
- determining a position of each lattice point in the ink amount space, wherein
- in the determining the position of the lattice point, with each of intervals between the lattice points in a range, which is a predetermined range in the ink amount space and with which an ink amount smaller than a predetermined duty value is associated, the position of the lattice point is determined so that a difference in a color value of each of printed matters printed using an ink amount set associated with each lattice point is equal to or less than a predetermined value.

16. A color prediction model creation apparatus comprising a color prediction model creation portion that creates a color prediction model by performing machine learning using teacher data created by the method of creating teacher data according to claim 1.

17. A method of creating color prediction model comprising creating a color prediction model by performing machine learning using teacher data created by the method of creating teacher data according to claim 1.

\* \* \* \* \*